United States Patent [19]

Bahn et al.

[11] Patent Number: 4,710,683
[45] Date of Patent: Dec. 1, 1987

[54] ROTATION DETECTING APPARATUS

[75] Inventors: Itsuki Bahn; Hideo Okada, both of Tokyo, Japan

[73] Assignee: Secoh Geiken Inc., Tokyo, Japan

[21] Appl. No.: 18,724

[22] Filed: Feb. 24, 1987

Related U.S. Application Data

[63] Continuation of Ser. No. 805,256, Dec. 5, 1985, abandoned, which is a continuation of Ser. No. 418,994, Sep. 16, 1982, abandoned.

[51] Int. Cl.$^4$ .............................................. H02K 29/00
[52] U.S. Cl. ..................................... 318/254; 318/138
[58] Field of Search .................... 318/254, 254 A, 138, 318/439, 314–317

[56] References Cited

U.S. PATENT DOCUMENTS 3,696,277 10/1972 Liska et al. ...................... 318/254 X
3,806,785 4/1974 DeValroger et al. .......... 318/439 X Primary Examiner—Benjamin Dobeck
Attorney, Agent, or Firm—Armstrong, Nikaido, Marmelstein & Kubovcik

[57] ABSTRACT

A rotation detecting apparatus for a rotary machine such as a DC motor, the apparatus including a magnet having a plurality of magnetic poles which rotates along with a rotary shaft of a rotary machine, electromagnetic conversion elements disposed in the magnetic field of the magnet, inductance elements disposed in the magnetic field, the inductance elements being spaced with a predetermined interval from the electromagnetic conversion elements, and an electric circuit for obtaining a voltage proportional to the number of rotations of the rotary machine, signals in proportion to the output voltages of the electromagnetic conversion elements and inductance elements being used as input signals to the electric circuit.

11 Claims, 43 Drawing Figures

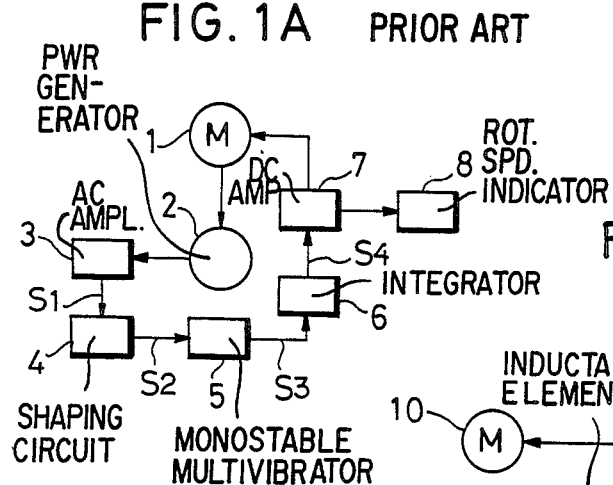
FIG. 1A PRIOR ART
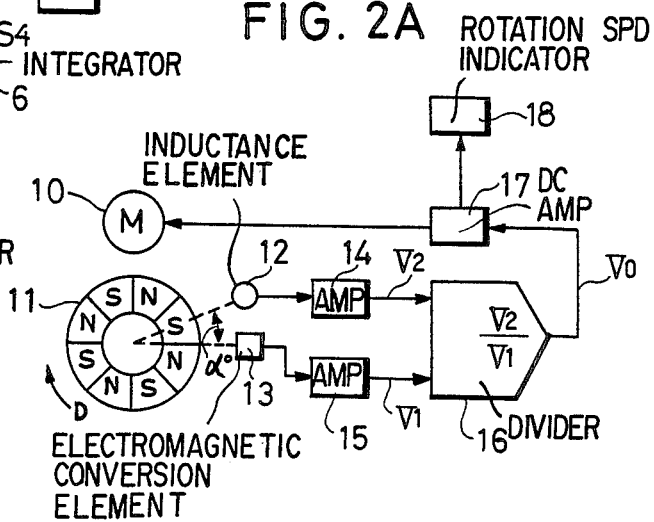
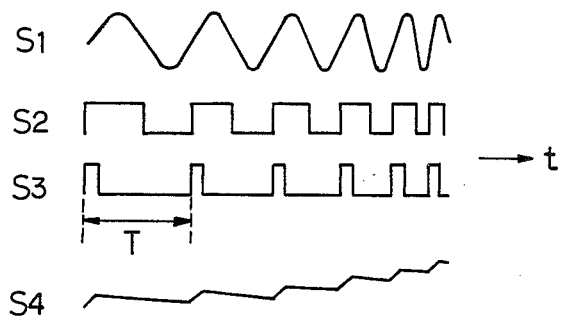
FIG. 1B PRIOR ART
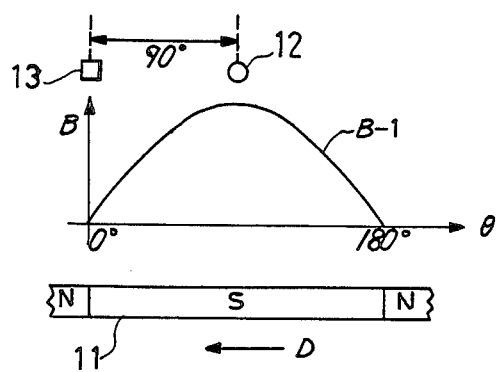
FIG. 2B FIG. 3A
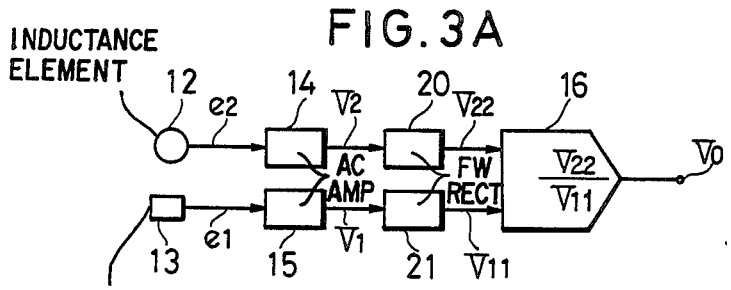
FIG. 3B
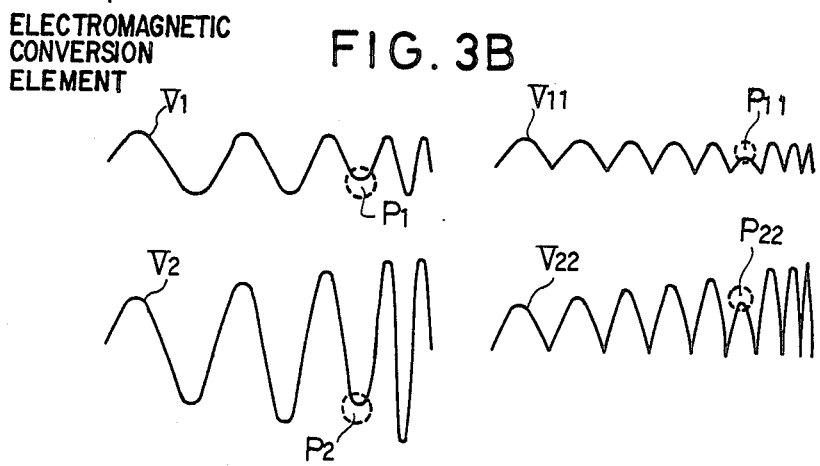
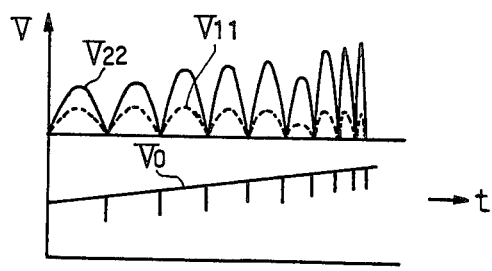
FIG. 4
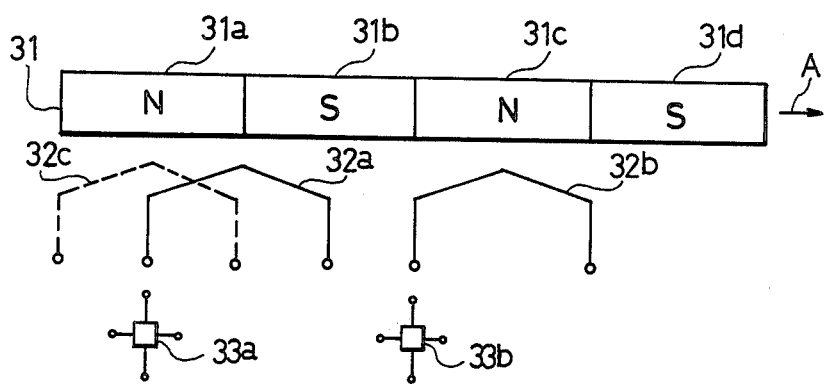

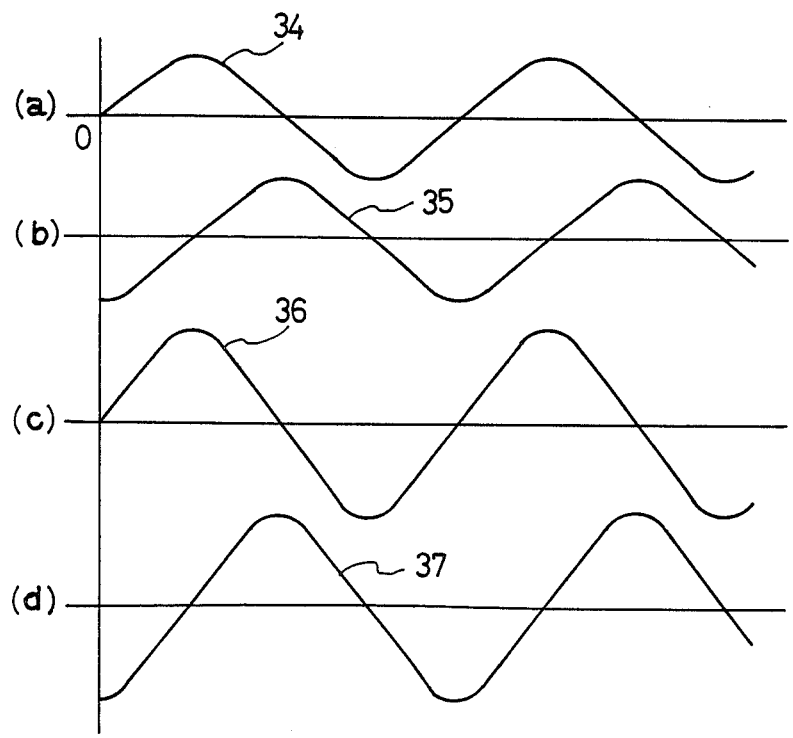
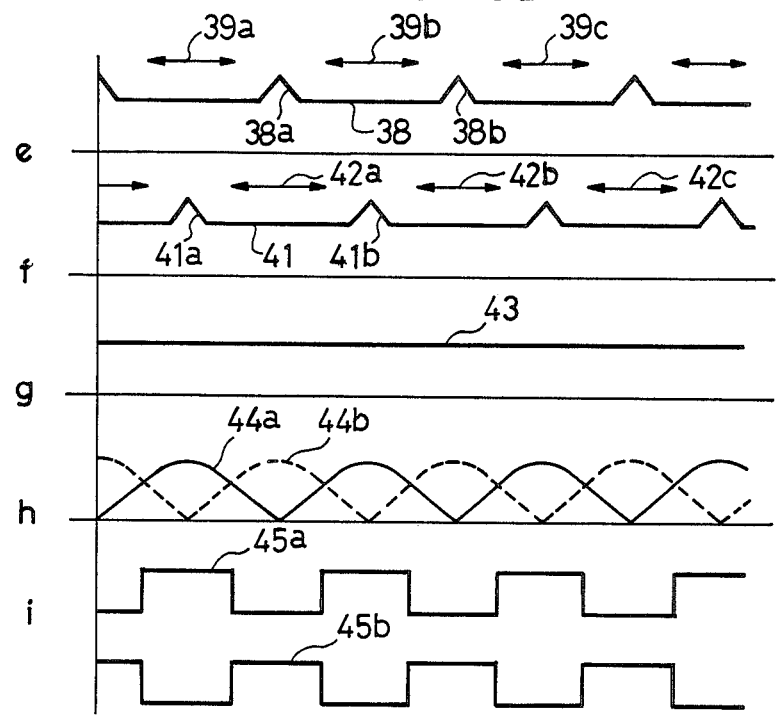

| Ee | Eh | I | Q |
|----|----|---|---|
| 0  | 0  | 0 | 1 |
| 0  | 0  | 1 | 0 |
| 0  | 1  | 0 | 0 |
| 0  | 1  | 1 | 1 |
| 1  | 0  | 0 | 1 |
| 1  | 0  | 1 | 0 |
| 1  | 1  | 0 | 0 |
| 1  | 1  | 1 | 1 |

ROTATION DETECTING APPARATUS

This application is a continuation of application Ser. No. 805,256 filed Dec. 5, 1985 now abandoned, which is a continuation of application Ser. No. 418,994 filed Sept. 16, 1982, now abandoned.

BACKGROUND OF THE INVENTION

1. Field of the Invention

This invention relates to a rotation detecting apparatus for obtaining an output voltage in proportion to the rotation speed of a rotary machine.

2. Description of the Prior Art

Up to now, various rotation detecting apparatuses have been proposed which are used to control a rotary machine at a constant speed or to measure the rotation speed of a rotary machine or the like. However, most of them had the defects such that a ripple voltage was included in a proportional output value at the time of rotation at a low speed or that the response property for speed was poor.

A conventional example is shown in FIG. 1A. By the rotation of a rotary machine 1, a frequency signal is generated from a power generator 2 and input to an amplifier 3. The output signal of the amplifier 3 is input to a waveform shaping circuit 4 and formed to a square wave, by which a monostable multivibrator 5 is triggered. The output signal of the monostable multivibrator 5 is smoothed by an integrating circuit 6. This comparatively small amplitude smoothed signal is amplified by a DC amplifier 7 to drive the next stage and to drive a rotation speed indicator 8. If the above-mentioned rotary machine 1 is, for example, a DC motor, by providing the above-mentioned DC amplifier 7 with a reference voltage generating circuit and a comparator for comparing this reference voltage with the smoothed signal from the above-mentioned integrating circuit 6, it will be possible to control the supply voltage of the motor and to maintain the rotation speed at a predetermined constant value.

FIG. 1B shows the signal waveforms at each section in the above-mentioned conventional example, indicating the states in which the rotation speeds increase gradually. Assuming that the source signal from the power generator 2 is a sine waveform, the output signal waveform of the amplifier 3 is as shown by $S_1$ and after waveform shaping, by $S_2$. By triggering the monostable multivibrator 5 on the rising section of the square shaped signal $S_2$, the output signal waveform of the monostable multivibrator 5 becomes a pulse waveform of which the repetition period T decreases along with the time t as shown by $S_3$.

Signal $S_4$ is the signal of pulse waveform $S_3$ smoothed, the voltage of which increases gradually. In the above-described example, a change of speed is detected each repetition period T in the case of signal $S_3$. Therefore, it is necessary to hold the preceding detected value before the next pulse waveform is applied and it is impossible to detect a change of speed in at least the holding period. Due to this the last stage signal becomes a staircase waveform like $S_4$; thus, it includes ripple. Furthermore, since the repetition period T exists, there is a defect that the time lag becomes large easily. This time lag and the including rate of the ripple component for the signal are significant especially at low speed rotation, that is, when the repetition period T is large.

It is necessary to satisfy the following conditions to obtain a DC output in response to the rotation speed with no defects as described above.

First, the ripple voltage which has no relation to the rotation speed must not be included in the output voltage. Second, there is a proportional relationship between the rotation speed and the detected signal. Third, good responsiveness must be obtained. Fourth, a sufficient detected signal must be obtained even at low rotational speed. In addition, the rotating direction must also be discriminated.

Although small power generators of the multi-phase rectifier type have been used generally to meet the above-mentioned conditions, there are defects such that there is a problem of durability because when the rectifier is used, electrical and mechanical noises are generated, and a multiple-winding armature must be used inevitably to reduce the ripple voltage component of the output voltage, so that the apparatus becomes complicated and expensive.

It is therefore an object of this invention to provide a rotation detecting apparatus in which by using a power generator with a magnet as the rotor, the number of phases of the armature coils is reduced by eliminating the rectifiers and brushes, and at the same time good responsiveness of the rotation speed output voltage is obtained by using an electric circuit having a special construction and the unnecessary ripple voltage is eliminated, thereby getting rid of the above-described defects.

SUMMARY OF THE INVENTION

The rotation detecting apparatus according to this invention is characterized in that the apparatus comprises:

a magnet having a plurality of magnetic poles which rotates along with a rotary shaft of a rotary machine;

electromagnetic conversion elements disposed in the magnetic field of the magnet;

inductance elements disposed in the magnetic field, the elements being spaced at a predetermined angular interval from the electromagnetic conversion elements; and an electric circuit for obtaining a voltage in proportion to the number of rotations by using as its input signals both a signal proportional to an output voltage of the electromagnetic conversion elements and a signal proportional to an output voltage of the inductance elements.

The objects, advantages and characteristics of the present invention will be further clarified in accordance with the following description regarding the embodiments of the invention taken in connection with the following drawings.

BRIEF DESCRIPTION OF THE DRAWINGS

FIGS. 1A and 1B are a block diagram and waveform drawing of the conventional example;

FIGS. 2A and 2B are, respectively, a block diagram showing an example of the fundamental concept of the present invention, and a representation of the relation between the magnetizing curve and detecting element;

FIGS. 3A and 3B are, respectively, a diagram showing another example of the present invention, and waveform drawings of each signal;

FIG. 4 is a developed view of the field magnet and armature coils illustrating an example of the magnets and inductance elements of the apparatus of the present invention;

FIGS. 5A and 5B are timecharts of the voltage curves in each section of the electric circuit shown in FIG. 6;

FIGS. 31(a)–(d) show voltage curves illustrating the relations between the Hall element outputs and the power generation outputs of the armature coils.

DESCRIPTION OF THE PREFERRED EMBODIMENTS

Figure 6:
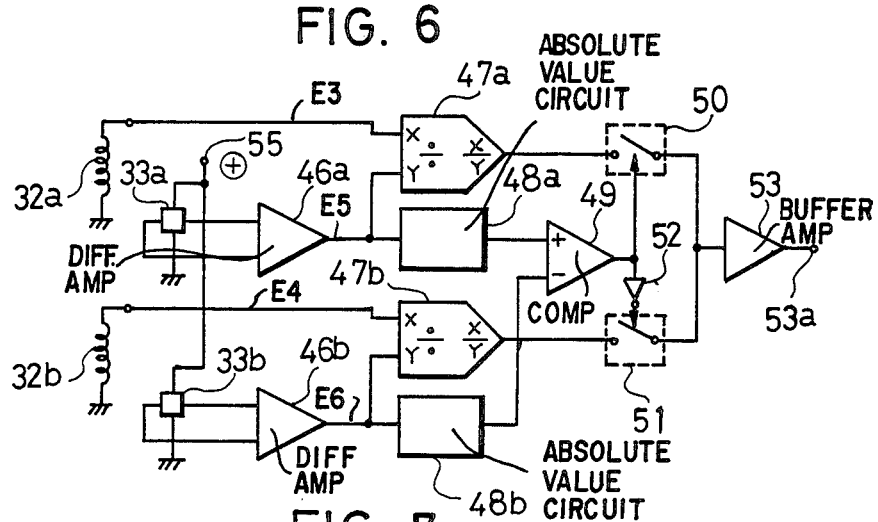
FIG. 6 is an electric circuit diagram illustrating another example of the apparatus according to the present invention.

The present invention will be described in detail with respect to the drawings. The rotation detecting apparatus according to the invention is shown in the block diagram of FIG. 2A.

In FIG. 2A, a magnet 11 rotates along with a rotary machine 10 and has a plurality of magnetic poles (in this drawing, magnetic poles magnetized alternately as eight poles of north (N) and south (S) polarity, in equal parts).

Inductance elements 12 and electromagnetic conversion elements 13 are located under the magnetic field of the above-mentioned magnet 11 and are disposed at a predetermined interval $\alpha°$ (in this drawing, $\frac{1}{2}$ of the width of one magnetic pole, that is, 22.5 degrees) for the magnet 11.

FIG. 2B shows the magnetizing curve (the axis of ordinate indicates the magnetic flux density B and the axis of abscissa indicates the electrical phase angle $\theta$) concerning one pole. In this drawing, the sine wave magnetizing curve B-1 between the interval of 0° through 180° of the S-pole is shown. In the drawing, the electrical phase angle difference between the electromagnetic conversion elements 13 and the inductance elements 12 is 90°.

The output signal of the above described inductance elements 12 is amplified by an amplifier 14 to become the signal $V_2$. On the other hand, the output signal of the above described electromagnetic conversion elements 13 is amplified by an amplifier 15 to become the signal $V_1$. The above-mentioned signals $V_1$ and $V_2$ are individually input to each of the two input terminals of a divider 16, which is an operator for executing the division of $V_1$ into $V_2$, and the signal $V_0$ is output therefrom. This signal $V_0$ is a quotient of $V_1$ and $V_2$, that is, the value is $V_2/V_1$.

The signal $V_0$ is input to a DC amplifier 17 before driving a rotation speed indicator 18. Assuming that the before-mentioned rotary machine is a motor which is not controlled, the supply voltage of the above-mentioned motor can be controlled similarly as described in the above-mentioned conventional example and the rotation speed becomes constant.

Now assuming that the magnetizing curve of one magnetic pole of the above-mentioned magnet 11 is a sine wave, then the change in the magnetic flux density B becomes a trigonometric function including a time element (variable) due to the rotation of the magnet 11. That is, if the time is t, the change of the magnetic flux density B over time will be expressed as:

$$B = A_0 \cdot \sin \omega t, \tag{1}$$

where $A_0$ is a constant and $\omega$ is an angular velocity. Now since the electromagnetic conversion elements convert the change of the magnetic flux density into an output voltage, the temporal change of the output voltage $e_1$ of the electromagnetic conversion elements is equivalent to that expressed in equation (1), that is, $$e_1 = A \cdot \sin \omega t, \tag{2}$$

where A is a constant.

Since the above-mentioned amplifier 15 outputs the voltage $V_1$ in proportion to the voltage $e_1$, the voltage $V_1$ is expressed by the following equation, $$V_1 = A_1 \cdot \sin \omega t, \tag{3}$$

where $A_1$ is a constant.

Next, the output voltage $e_2$ of the inductance elements is obtained.

Now assuming that the inductance elements are disposed in the magnetic field of the magnet and are coils having the two straight line sections (going route and returning route, each having the length L) in the diametral direction of the magnet, and that the open angle of these two straight line is $\beta$, and that the phase difference between the center of the coils and the above-mentioned electromagnetic conversion elements is the electrical phase angle of 90° ($\pi/2$) and that when the magnet 11 rotates in the direction indicated by the arrow D, the magnetic flux $\phi$ which penetrate the coil surface is given by the following equations: if L=1, $$\phi = L \cdot \int_{\omega t + \frac{\pi}{2} - \frac{\beta}{2}}^{\omega t + \frac{\pi}{2} + \frac{\beta}{2}} A_0 \cdot \sin e^{\omega t} \cdot d(\omega t) \tag{4}$$

$$= 2L \cdot A_0 \cdot \sin \frac{\beta}{2} \cdot \cos \omega t.$$

Therefore, the coil output voltage $e_2$ is expressed as:

$$e_2 = -\frac{d\phi}{dt} = 2A_0 \cdot \sin \frac{\beta}{2} \cdot \omega \cdot \sin \omega t, \tag{5-a}$$

where L=1, and 2, $A_0$ and sin $\beta/2$ are all constants. Now assuming that $$2A_0 \times \sin \frac{\beta}{2}$$

is a new t r constant $A_3$, equation (5-a) will be expressed as:

$$e_2 = A_3 \cdot \omega \cdot \sin \omega t. \tag{5-b}$$

The output voltage $V_2$ from the amplifier 14 is equivalent to that in equation (5-b), that is, $$V_2 = A_4 \cdot \omega \cdot \sin \omega t, \tag{6}$$

where $A_4$ is a constant.

Consequently, the quotient $V_0$ of $V_1$ and $V_2$ is expressed as:

$$V_0 = \frac{V_2}{V_1} = \frac{A_4 \cdot \omega \cdot \sin \omega t}{A_1 \cdot \sin \omega t} = \frac{A_4}{A_1} \cdot \omega \tag{7}$$

If the constant $A_4/A_1$ is K, we have the equation:

$$V_0 = K \cdot \omega, \tag{8}$$

thus, $V_0$ is proportional to only the angular velocity $\omega$. On the other hand, when the magnet 11 rotates in the reverse direction to that indicated by the arrow D, the preceding equation (5-a) changes to the following equation (9), $$e_2 = -\frac{d\phi}{d(-t)} = 2A_0 \cdot \sin \frac{\beta}{2} \cdot \omega \cdot \sin \omega t. \tag{9-a}$$

Therefore, from equation (6), the output voltage $V_2$ from the amplifier 14 is expressed as:

$$V_2 = -A_4 \cdot \omega \cdot \sin \omega t. \tag{9-b}$$

Then the quotient $V_0$ is expressed as:

$$V_0 = \frac{-A_4 \cdot \omega \cdot \sin \omega t}{A_1 \cdot \sin \omega t} = -\frac{A_4}{A_1} \cdot \omega, \tag{10}$$

and further $A_4/A_1 = K$, thus, we have $$V_0 = -K \cdot \omega. \tag{11}$$

Consequently, the voltage in the negative direction has an absolute value which is equal to that expressed in equation (8).

If the number of rotations of the magnet 11 is M times per second and the number of the magnetic poles is m, the value of is, $$\omega = \pi 2f = 2\pi \cdot \frac{m}{2} \cdot M = \pi \cdot m \cdot M, \tag{12}$$

where f is a frequency. The term m/2 means that one sine wave consists of one cycle produced by a pair of N and S poles.

As described above, the output $V_0$ has a value in proportion to only the number of rotations, and at the same time, according to the polarity of the voltage, it is possible to determine whether the motor rotates in the forward or reverse direction. In the above-described example, the divider was used as an electric circuit for obtaining a voltage in proportion to the number of rotations; however, in case of an ordinary divider, many dividers have a limitation that both a numerator and denominator must have negative values simultaneously. Therefore, an example of an electric circuit which can always take positive values as numerator and denominator will be explained with respect to FIG. 3.

FIG. 3A is a block diagram, wherein the circuit shown has substantially the same construction as in the above-mentioned FIG. 2 up until the stage which receives the output $e_1$ of the electromagnetic conversion elements 13 and the output $e_2$ of the inductance elements 12, and the signals $V_2$ and $V_1$ shown in FIG. 3B, which outputs $e_1$ and $e_2$ are amplified by the amplifiers 14 and 15.

Since the sine wave signals $V_1$ and $V_2$ are AC signals which repeat the positive/negative values alternately, in order to always obtain the positive values above zero, signals $V_1$ and $V_2$ are input to full-wave rectifying circuits 20 and 21. The output signals from the full-wave rectifying circuits 20 and 21 are $V_{11}$ and $V_{22}$, which have the signal waveforms as shown in FIG. 3B. In this case, the rotation speed gradually increases in the same manner as described for FIG. 1. If there are portions where the magnetization of the magnet is not uniform and the magnetic flux densities decrease in the related magnetic poles, in spite of the increase in the rotation speed, the amplitudes decrease as shown at point $P_1$ for $V_1$ and at point $P_2$ for $V_2$. Therefore, there are also portions where the amplitudes decrease as shown at points $P_{11}$ and $P_{12}$ for the full-wave rectified signals $V_{11}$ and $V_{22}$.

The above-mentioned full-wave rectified signals $V_{11}$ and $V_{22}$ are input to a divider 16, which outputs the quotient $V_0$, that is, the operation value of $V_{22}/V_{11}$.

The waveform of this signal $V_0$ is a DC voltage, without pulsation, and is in proportion to the rotation speed as shown in FIG. 3B.

The temporal change of the magnetic flux density B at the portion where the magnetic flux decreases cannot be shown by the above-mentioned equation (1) but can be obtained by the following equation:

$$\beta = A_0 \cdot \mu \cdot \sin \omega t, \tag{13}$$

where the term indicative of the amplitude is changed and $\mu$ is the degradation rate.

Consequently, the amplitudes of the full-wave rectified signals $V_{11}$ and $V_{22}$ are also shown similarly using the degradation rate. The afore-mentioned equations (3) and (6) are changed as follows:

$$V_{11} = |A_1 \cdot \mu \cdot \sin \omega t| \tag{14}$$

$$V_{22} = |A_4 \cdot \omega \cdot \mu \cdot \sin \omega t| \tag{15}$$

In these expressions, the absolute value symbols are indicated because the signals are full-wave rectified. Although the term of the amplitude was changed, the quotient $V_0$ is of the same value regardless of $\mu$ as expressed in the equation:

$$V_0 = \frac{V_{11}}{V_{22}} = \frac{|A_4 \cdot \omega \cdot \mu \cdot \sin\omega t|}{|A_1 \cdot \mu \cdot \sin\omega t|} = \frac{A}{A} \cdot \omega \tag{16}$$

which is the same value as expressed in equation (7). Therefore, in FIG. 3B, the signal $V_0$ shows the DC voltage according to the increase in the rotation speed even in the portion where the magnetic flux density decreases.

The portion where the change occurs intermittently like a trigger pulse is shown by $V_0$, which is a straight line which gradually increases, in FIG. 3B. This is because the output value becomes indefinite at the portion where the quotient is 0/0. However, the time period during which the quotient is 0/0 during rotation is fundamentally zero seconds, so that the portions where the change occurs like a trigger pulse as shown in the figure are hardly shown on the figure essentially, and they can be neglected actually. As described above, according to the present example, it is possible to output the rotation speed as a voltage signal using and ordinary divider, which signal doesn't have the time lag nor the ripple. Although in this case it is impossible to detect the rotating direction because the full-wave rectifying circuit is included, this circuit exhibits a remarkable effect functionally for detecting the rotation speed. The stage up until the signal $V_0$ output is shown in FIG. 3, and the subsequent stages are the same as those of FIG. 2, so they are omitted.

In the above description regarding FIGS. 2 and 3, the magnetizing curve is assumed to be a sine wave; however, even if the magnetizing curve is not a sine wave near the magnet 11, by changing the distances from the electromagnetic conversion elements and inductance elements to the magnet 11 along the direction of the magnetization from the magnet 11, it will be possible to make the magnetizing curve correspond to a sine wave according to the extent of the diffusion of the magnetic lines of force. Therefore, even if the magnetizing curve itself is not a sine wave, it will be apparently suitable that the above-mentioned signals $V_1$ and $V_2$ are eventually sine waves.

It is also possible to process the signals $V_1$ and $V_2$ in accordance with other mathematical functions. Now assuming that the magnetic flux density, which changes over time, is expressed as:

$$B = A_0 \cdot e^{\omega t} \tag{17}$$

from equation (1), and if $$V_1 = A_1 \cdot e^{\omega t} \tag{18}$$

by changing equation (3), equation (4) will be expressed as:

$$\phi = L \cdot \int_{\omega t + \frac{\pi}{2} - \frac{\beta}{2}}^{\omega t + \frac{\pi}{2} - \frac{\beta}{2}} A_0 \cdot e^{\omega t} \cdot d(\omega t) \tag{19}$$

$$= L \cdot \left[ e^{\omega t + \frac{\pi}{2} - \frac{\beta}{2}} - e^{\omega t + \frac{\pi}{2} - \frac{\beta}{2}} \right]$$

Equation (5-a) will be expressed as:

$$e_2 = -\frac{d\phi}{dt} = \omega \cdot e^{\omega t} \cdot \left[ e^{\frac{\pi}{2} - \frac{\beta}{2}} - e^{\frac{\pi}{2} + \frac{\beta}{2}} \right] \tag{20}$$

if $L = 1$, and if $$e^{\frac{\pi}{2} - \frac{\beta}{2}} - e^{\frac{\pi}{2} + \frac{\beta}{2}} = A_5$$

(where $A_5$ is a constant), equation (6) will be expressed as:

$$V_2 = A_5 \cdot \omega \cdot e^{\omega t}. \tag{21}$$

Consequently, the quotient $V_0$ is:

$$V_0 = \frac{V_2}{V_1} = \frac{A_5 \cdot \omega \cdot e^{\omega t}}{A_1 \cdot e^{\omega t}} = \frac{A_5}{A_1} \cdot \omega \tag{22}$$

Now if $A_5/A_1 = K_1$, we have:

$$V_0 = K_1 \cdot \omega \tag{23}$$

therefore, $V_0$ is proportional to the angular velocity $\omega$. In conclusion, the magnetization may be done according to such an exponential function.

In the case that the above-mentioned open angle $\beta$ of the two straight line portions of the coil is equal to the open angle of one magnetic pole, that is, the electrical phase angle $\beta = 180° = \pi$ in FIG. 2B, if the magnetic flux density, which changes over time, is shown as B ($\omega t$), equation (4) will be expressed as $$\phi = L \cdot \int_{\omega t}^{\omega t + \pi} B(\omega t) \cdot d(\omega t) \tag{24}$$

If $\int B(\omega t) \cdot d(\omega t) = F(\omega t)$, equation (5-a) will be expressed as $$e_2 = -\frac{d\phi}{dt} = -\frac{d}{dt} \int_{\omega t}^{\omega t + \pi} B(\omega t) \cdot d(\omega t) \tag{25}$$

$$= -\frac{d}{dt}[F(\omega t + \pi) - F(\omega t)]$$

$$= -\omega \cdot \frac{d}{d(\omega t)}[F(\omega t + \pi) - F(\omega t)]$$

$$= -\omega \cdot [B(\omega t + \pi) - B(\omega t)]$$

If the magnetic flux density of the portion where the phase differs by only $\pi$ in the magnet 11 (that is, the portion having the same phase at the neighboring polarity) is equal (but, the polarity is opposite) to that of the adjacent portion, $B(\omega t + \pi) = -B(\omega t)$, then equation (25) may be expressed as:

$$e_2 = 2\omega \cdot B(\omega t), \quad (26)$$

therefore, equation (6) is changed to $$V_2 = A_6 \cdot \omega \cdot B(\omega t), \quad (27)$$

where $A_6$ is a constant. In this case, since $V_1$ is equation (3) is:

$$V_1 = A_7 \cdot B(\omega t) \quad (28)$$

($A_7$ is a constant), the quotient $V_0$ of equation (7) is expressed as:

$$V_0 = \frac{V_2}{V_1} = \frac{A_6 \cdot \omega \cdot B(\omega t)}{A_7 \cdot B(\omega t)} = \frac{A_6}{A_7} \cdot \omega \quad (29)$$

If $A_6/A_7 = K_2$, we have eventually $$V_0 = K_2 \cdot \omega \quad (30)$$

in like manner as in the expression of equation (8). Thus, $V_0$ is proportional to only the angular velocity $\omega$. The magnetization of $B(\omega t)$ may be done according to any function instead of the specified function if the magnetic flux densities of the portions where the electrical angle of the phase difference is $\pi$ are equal respectively as described above.

In this case, as described above, since the open angle of the straight line portions of the coils is equal to the width of the magnetic pole, it is possible to use the counter-electromotive force from the armature coils having an open angle equal to the width of the magnetic pole (this counter-electromotive force is proportional to the product of the magnetic flux density and the angular velocity) as the signal of the inductance elements.

As is clear from the above description, in accordance with the present invention, it is possible to detect the rotation speed and the rotating direction of the rotary machine from a super-low speed rotation without the time delay and ripple. In the case that the above-mentioned rotary machine is a motor of the magnet rotor type, the rotor itself may be used as the above-mentioned magnet 11. Moreover, in the case that this motor of the magnet rotor type is a DC motor having position detecting elements, if these position detecting elements are the electromagnetic conversion elements, the above-described signal $V_1$ can be obtained from the electromagnetic conversion elements. Consequently, the rotation detecting apparatus according to the present invention can be extremely simply and cheaply realized.

Next, FIGS. 4–8 show another example of the rotation detecting apparatus according to the present invention. In this example, the following characteristics will be mentioned: the commutators and brushes are removed from a power generator which uses a field magnet as its rotor; the number of phases of the armature coils is decreased (two or three phases); good responsiveness of the output voltage for detecting the rotation speed can be obtained by using the electric circuit having the special construction using the dividing circuit; and the unnecessary ripple voltage is eliminated.

FIG. 4 is a developed view of a field magnet 31 and armature coils 32a and 32b of the power generator having a two-phase armature.

In FIG. 4, the rotor or field magnet 31 comprises magnetic poles 31a, 31b, . . . 31d of N and S polarity whose open angles are 90°. The magnetic field of each magnetic pole penetrates the conductive portions of the armature coils 32a and 32b attached to a fixed armature. The armature coils have two phases, the open angle between the conductors is equal to the width of the magnetic poles 31a, 31b, . . . 31d, the armature coils are located at the positions of the armature coils 32c and 32a indicated by the dotted line. The same effect can be obtained by moving the armature coil 32c to the position of the armature coil 32b with the same phase. Due to such means, the two armature coils can be disposed on the armature without overlapping each other, so that this will be an effective means for mass production. The means for disposing such armature coils is disclosed in detail in the Japanese published unexamined patent application No. 36507 of 1976. Hall elements 33a and 33b, which are the magnetic-sensitive elements, are fixed to the positions respectively, where the phases are the same as at the conductive portions of the armature coils 32a and 32b.

Figure 7:
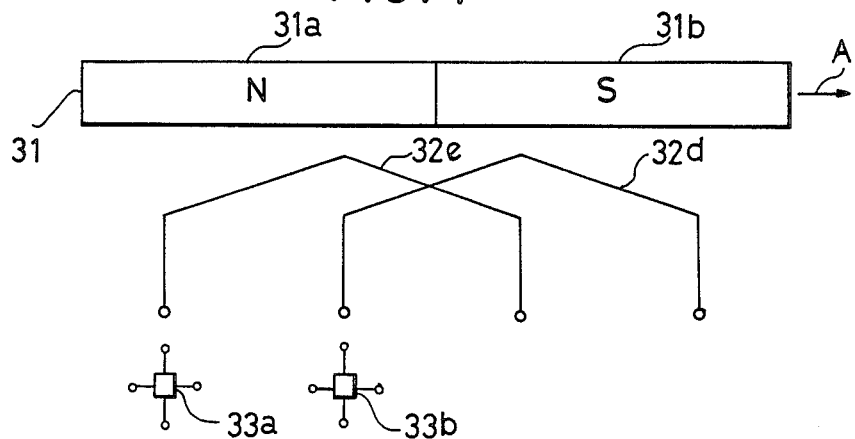
FIG. 7 is a developed view of another example of the field magnet and armature coils.

The developed view of FIG. 7 shows the conventional means to achieve the same object, wherein the field magnet 31 has two polarities, the armature coils 32d and 32e are disposed on a fixed armature having the electrical angle of 90° as a phase difference, and the Hall elements 33a and 33b are fixed to the positions having the same phases as those of the conductive portions of the armature coils 32d and 32e.

When the field magnet 31 of FIGS. 4 and 7 rotates in the direction indicated by the arrow A, an alternating current having a phase which differs by 90° is generated in the two-phase armature coils. Its waveform is proportional to the product of the strength of the magnetic field and the rotation speed.

Next, the apparatus of the present invention will be described with respect to the electric circuit of FIG. 6.

In FIG. 6, the armature coils 32a and 32b of FIG. 4 are shown by the same reference numerals. The power generating output of the armature coil 32a is input to the X terminal of a dividing circuit 47a of FIG. 6 in accordance with the curve 34 shown by the graph (a) of the timecharts shown in FIG. 5A. The power generating output of the armature coil 32b is input to the X terminal of a dividing circuit 47b in accordance with the curve 35 shown by the graph (b) of FIG. 5A. Assuming that the strengths of the magnetic fields penetrating the armature coils 32a and 32b are referred to as $H_1$ and $H_2$, respectively, the curve 34, i.e. the input voltage $E_3$ of the X terminal of the dividing circuit 47a will be expressed as:

$E_3 = K_3 N H_1$ (N indicates the rotation speed of the field magnet), and similarly the input voltage $E_4$ of the X terminal of the dividing circuit 47b is expressed as:

$$E_4 = K_3 N H_2.$$

The electrical constants of the armature coils 32a and 32b are equal, so constant $K_3$ is common.

The electricity from a DC voltage positive terminal 55 is passed to the Hall elements 33a and 33b indicated by the same reference numerals in FIGS. 4 and 7; therefore, as shown in FIG. 6, each of the respective outputs of elements 33a and 33b is amplified respectively by corresponding differential amplifying circuits 46a and 46b and then input to the Y terminals of the dividing circuits 47a and 47b respectively. The curves of such input voltages at the Y terminals are shown as the curves 36 and 37 of the graphs (c) and (d) of FIG. 5A. The voltages $E_5$ and $E_6$ (the values of the axis of ordinate) of the curves 36 and 37 are expressed as:

$$E_5 = K_4 H_1, \quad E_6 = K_4 H_2.$$

Constant $K_4$ is set so that it is common to both expressions.

The output of the dividing circuit 47a of FIG. 6 is expressed as: $E_3/E_5 = K_3/K_4 N$, and the output of the dividing circuit 47b is expressed as: $E_4/E_6 = K_3/K_4 N$, and $K_3/K_4$ is a constant, so the outputs are proportional to the rotation speed. Since the dividing circuits 47a and 47b are four-quadrant dividing circuits, the outputs of the dividing circuits 47a and 47b are shown as the curves 38 and 41 shown in the graphs (e) and (f) of the timecharts of FIG. 5B, respectively. Although no linear portion is seen in the curves 38a and 38b, ... and curves 41a and 41b of the graphs (e) and (f), in these portions of the curves the two inputs of the dividing circuits 47a and 47b indicate zero values, that is, portions of undefined values. The method for eliminating those portions will be explained below.

In FIG. 6, the outputs of the differential amplifying circuits 46a and 46b are respectively input to absolute value circuits 48a and 48b are converted into positive voltages. The curve 44a of the graph (h) of FIG. 5B shows the output curve of the absolute value circuit 48a and the curve 44b shows the output curve of the absolute value circuit 48b. The outputs of the absolute value circuits 48a and 48b are input to a comparator 49 and the output is as shown in the curve 45a of the graph (i) of FIG. 5B, and the circuit is constructed so that at the high level portion of this curve an analog switch 50 is closed. The output (the curve 45b of the graph (i)) of an inverter circuit 52 is input to analog switch 51. Therefore, the input of a buffer amplifier 53 becomes the voltage at which the voltages of the curves 38 and 41 in the intervals of the graph (3) indicated by the arrows 39a, 39b ... and the arrows 42a, 42b ... were extracted. The abnormal points, that is, the curves 38a, 38b ... and 41a, 41b ... are eliminated, and the output at the terminal 53a is as shown in the curve 43 of the graph (g). As will be understood from the above-described theory, the output of the terminal 53a is proportional to the rotation speed N and the dividing circuits 47a and 47b are four-quadrant dividing circuits; therefore, there is a characteristic that the output of the terminal 53a is obtained as a positive or negative output corresponding to whether the rotating direction is forward or reverse. In addition, since the output doesn't include the ripple voltage and no smoothing circuit is provided in the circuit, there is a characteristic that a rotation speed detecting apparatus having good responsiveness can be obtained. Of course, both the commutators and brushes are eliminated.

Figure 8:
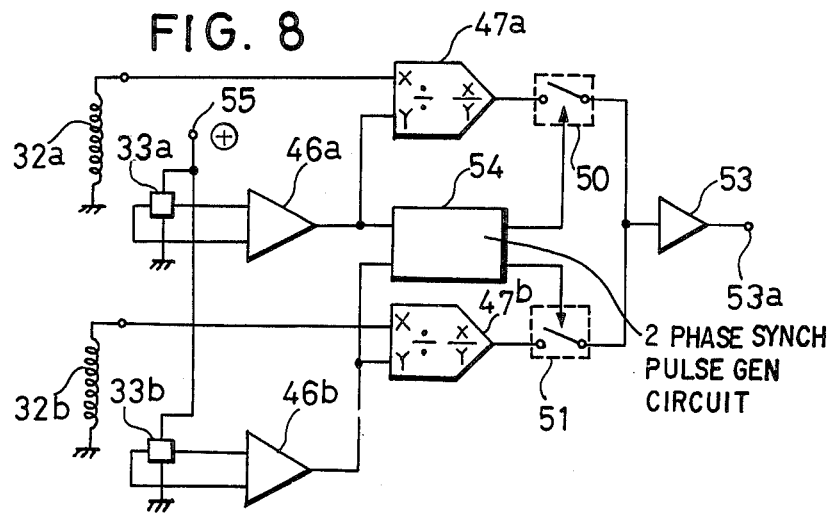
FIG. 8 is an electric circuit diagram of another example of the apparatus of the present invention.

The electric circuit in FIG. 8 is illustrated as a two-phase synchronizing pulse generating circuit 54, wherein the absolute value circuits 48a and 48b and the comparator 49 of the electric circuit of FIG. 6 are combined together; the other parts which are the same as those of FIG. 6 are designated by the same reference numerals. Thus, their functions and effects are identical.

In FIG. 6, the object is achieved by using the two-phase armature coils 32a and 32b as the armature coils; however, the same object can be achieved by providing the three armature coils of the three-phase armature coil with the electric circuits shown in FIG. 6, respectively. In this case, the same object can be achieved by using a half-wave rectifying circuit instead of the absolute value circuits 48a and 48b. In this case, the dividing circuits 47a and 47b, ... are constructed so that the output thereof become positive or negative in value corresponding to whether the positive or negative signals are input to the X terminals, and only the positive outputs among the outputs of the differential amplifying circuits 46a, 46b ... are taken out and then input to the Y terminals and the comparator 49. The two-phase synchronizing pulse generating circuit 54 of FIG. 8 changes to a three-phase synchronizing pulse generating circuit. In the case of the three-phase armature coils, by using the means shown in FIG. 6 which is substantially identical to the two-phase armature coils, the above-mentioned three-phase synchronizing pulse generating circuit becomes a six-phase synchronizing pulse generating circuit; consequently, the object can be achieved by closing of the corresponding analog switches 50, 51 ... by the outputs of circuit 54.

In the examples of FIGS. 6 and 8, the outputs of each of the armature coils are divided in each phase and finally they are added by the analog switches 50 and 51, thereby obtaining the desired output. The same object can also be obtained by the following means. That is, the outputs of the differential amplifying circuits 46a and 46b are full-wave rectified respectively by the absolute value circuits and by adding these outputs with an adder, the resulting output voltage $E_4$ is expressed as:

$$E_4 = K_4(H_1 + H_2),$$

where $H_1$ and $H_2$ indicate the strengths of the mgnetic fields which pass through the Hall elements 33a and 33b, respectively.

In like manner, the outputs of the armature coils 42a and 42b are full-wave rectified by the absolute value circuit and by adding these outputs, the output voltage $E_3$ is expressed as:

$$E_3 = K_3 N(H_1 + H_2).$$

The rotation speed N can be obtained by obtaining $E_4/E_3$ using the dividing circuit. The effects are entirely identical. In this case, it is impossible to discriminate whether the rotor rotates in the forward direction or in the reverse direction. However, it is possible to discriminate the forward or reverse direction of the rotation by rectifying, by providing the means for discriminating the positive or negative polarity of the outputs of the armature coils 32a and 32b instead of using the above-described absolute value circuit. Exactly the same means can be also applied for the three-phase armature coils.

The addition (H1+H2) of the above-mentioned H1 and H2 is not an algebraic addition; however, the same object can be achieved by performing the addition such that each of the duplex portions of the outputs of the armature coils 32a and 32b and the Hall elements 33a and 33b is eliminated. In the case of a Hall motor which uses the Hall elements as the position detecting elements, the following means can be adopted. That is, when the motor is rotating, the outputs which are entirely similar to the outputs obtained by the Hall elements 33a and 33b of the present invention can be obtained by using the Hall elements which are the position detecting elements. It is also possible to obtain the counter-electromotive forces of each of the armature coils by using well-known means (for example, by using the bridge circuit of a bridge servo circuit).

Since the above-mentioned two output voltages correspond to the outputs of the differential amplifying circuits 46a and 46b of FIG. 6 and to the outputs of the armature coils 32a and 32b, there is a characteristic that it is possible to obtain the apparatus for detecting the rotation speed N by applying the apparatus of the present invention without requiring any particular additional parts. Such an apparatus is effective if it is used as a servo motor.

FIGS. 9-25 show another example in which the present invention was applied to a DC motor (of the axial cavity type). In this example, the motor is a semiconductor motor which uses magnetic-sensitive elements such as Hall elements as position detecting elements, it is constructed such that the armature coils for power generation are added or the armature coils for driving are also used as power generating coils, thereby obtaining voltages in proportions to the rotation speed by using only an additional electric circuit. Therefore, it is possible to obtain a rotation speed signal without using any tachogenerator. Since this output signal doesn't include the ripple voltage, nor is a capacitor required for smoothing the signal, a velocity signal with good responsiveness can be obtained. Thus, there is an effect such that it is possible to provide the effective technical means if it is used as for example a servo motor.

Figure 9:
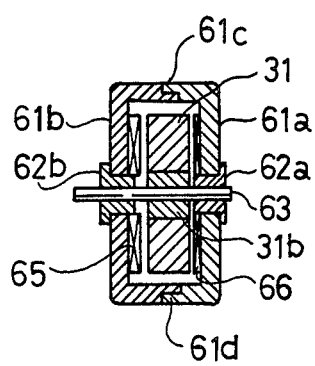
FIG. 9 is an explanatory view illustrating another example of the apparatus of the present invention.

In FIG. 9, numerals 61a and 61b are casings of the cylindrical type, each having bottom portions. Bearings 62a and 62b are fixed to each bottom and a rotary shaft 63 is rotatably supported by each bearing. Connecting portions 61c and 61d of the cylindrical casings 61a and 61b are fixed by an adhesive.

The casings 62a and 62b construct the yoke (magnetic substance) without eddy-current loss, and fan-shaped armature coils 65 (driving coils) and armature coils 66 (power generating coils) are fixedly attached on each of the bottoms by the means shown in the developed view described later. The method for producing the casings 62a and 62b is as follows. That is, they are produced from sintered metal in the same manner as a soft ferrite core, or they can be formed to a desired shape by mixing pulverized soft steel in with plastic material and then performing an injection molding or pressure molding (compression). A disk-shaped field magnet 31 is fixed to the rotary shaft 63 through a plastic material 64.

The above-mentioned motor is a well-known type wherein the energization of the armature coils 65 for driving is controlled through a control circuit of passing electricity (not shown) by the outputs of the Hall elements (not shown) which are the position detecting elements, thereby being driven as the semi-conductor motor. The details of such a motor are disclosed in the Japanese published unexamined patent application No. 36507 of 1976.

Figure 12:
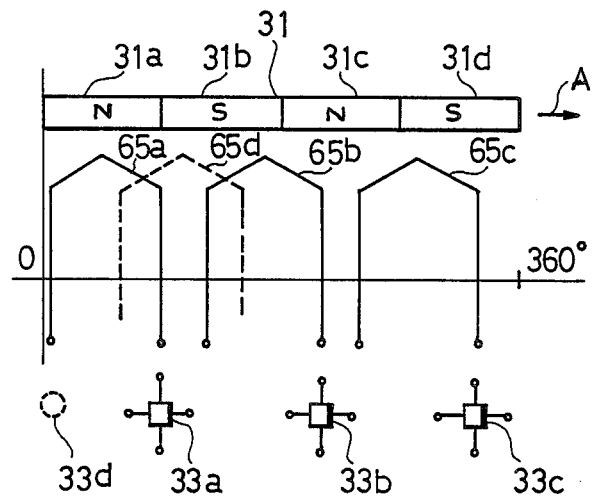
FIG. 12 is a developed view of the field magnet and armature coils.
Figure 21:
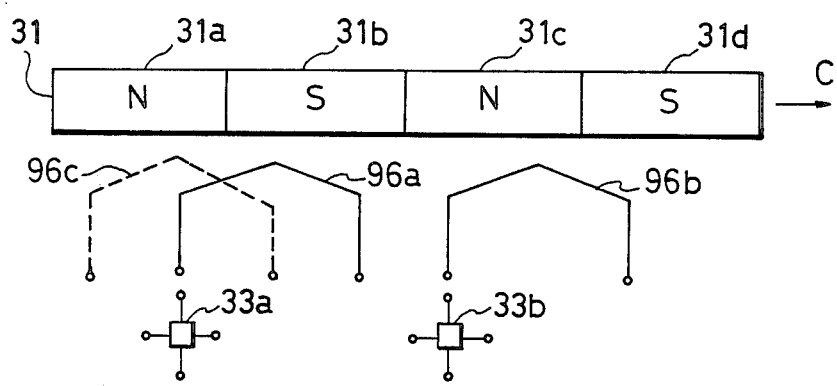
FIG. 21 is a developed view of the field magnet and armature coils of the example of FIG. 19.

The two- or three-phase armature coils 66 are used and the developed views are shown in FIGS. 21 and 12. Since the construction of the two-phase armature coils is the same as those shown in FIG. 4, the same numerals or symbols in the drawings indicate the same functions or the same parts. Numerals 96a, 96b, . . . indicate the armature coils.

In the case of the three-phase armature coils, as shown in FIG. 12, the armature coils 65 indicated by the dotted lines are moved to the position of the armature coils 65c, so that the overlapping of the armature coils is eliminated. The field magnet 31 and the Hall elements 33a, 33b and 33c are shown by the same numerals as in FIG. 21.

In both FIGS. 12 and 21, the desired energization is provided to each of the armature coils by the outputs of the Hall elements 33a, 33b and 33c through the control circuit of passing electricity, so that the field magnet 31 becomes the semiconductor motor which rotates in the direction indicated by the arrow A or C.

Figure 10:
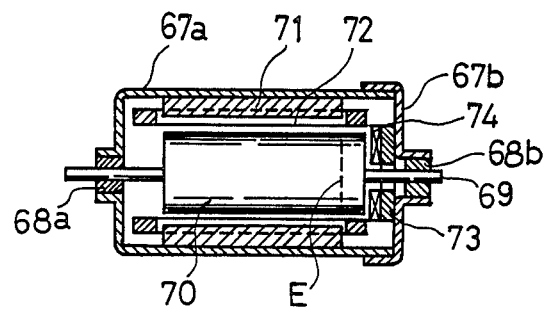
FIG. 10 is an explantory view of another example of the apparatus of the present invention.

Next, FIG. 10 shows a semiconductor motor of an ordinary type to which the present invention is applied. In FIG. 10, a cover 67b is fixed to the right edge of a cylindrical casing 67a made of soft steel and bearings 68a and 68b are fixed to both. A rotary shaft 69 is rotatably supported by the bearings 68a and 68b and a field magnet 70 is fixed to the rotary shaft 69. The detail of the field magnet 70, which is the rotor, is shown in FIG. 11.

Figure 11:
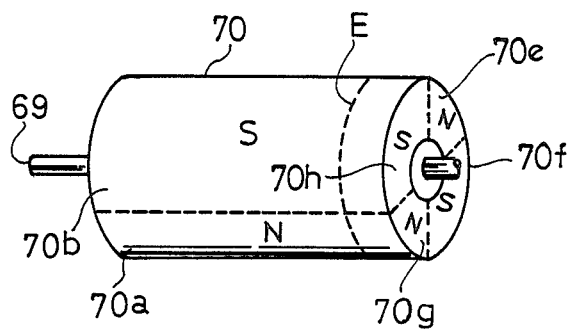
FIG. 11 is a perspective view of the field magnet.

In FIG. 11, the field magnet 70 comprises a ferrite magnet. Magnetic poles 70a and 70b of N and S polarities are disposed at an open angle of 90° along the circumferential surface and N and S magnetic poles 70e, 70f, 70g, and 70h are also disposed at an open angle of 90° on the surface of the right edge. The above-mentioned two pairs of field magnets are formed in a body or divided into two bodies at the portion indicated by the dotted lines E and each of them are fixed to the rotary shaft 69. Armature coils 74 for power generation (shown in FIG. 10) are fixedly attached on a yoke 73 facing the field magnets 70e and 70f. The yoke 73 is made of the same material as the yokes 61a and 61b of FIG. 9. The yoke 73 is fixed on the inside surface of the cover 67b.

In FIG. 10, the part indicated by numeral 71 is a yoke of armature coils 72, which part is made of the same material as the yokes 62a and 62b of FIG. 9.

Next, the yoke 71 and armature coils 72 will be described in detail with respect to FIG. 14.

Figure 13B:
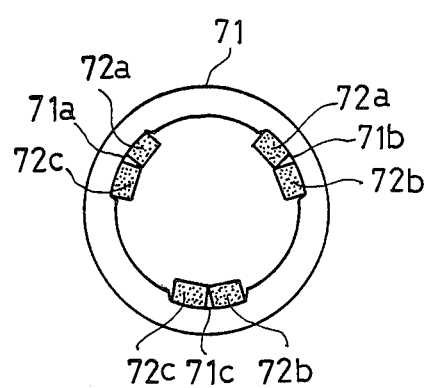
Figure 14:
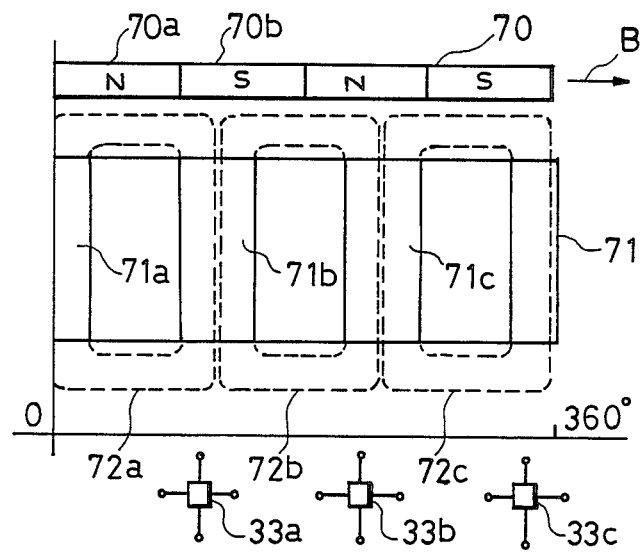
FIG. 14 is a developed view of the field magnet and armature coils of the motor of FIG. 10.

FIG. 14 is a developed view over 360° illustrating the field magnet 70, yoke 71 and armature coils 72a, 72b and 72c (which are the three-phase armature coils which are attached so that they don't overlap each other, as described for FIG. 12). The widths of the conductive portions of the armature coils 72a, 72b and 72c are indicated by the dotted lines, are equal to the width of the magnetic pole of the field magnet 70, and the coils are wound in a rectangular shape, which is indicated by the dotted lines. The long grooves 71a, 71b and 71c, whose lengths are twice the widths of the armature coils, are formed in the yoke 71, to which the conductive portions of each of the armature coils are arranged by twos; they are useful for determining the positions of each armature coil and for fixing them. Since excessive depths of the long grooves 71a, 71b and 71c cause strong cogging to occur, it is necessary to form them in appropriate depths. The yoke 71 is fixedly attached to the inside of the casing 67a and constitutes the fixed armature as shown in FIG. 10. The Hall elements 33a, 33b and 33c of FIG. 14 are disposed relative to the yoke 71 at the positions of the same phases with each of the armature coils, and the energizations of the armature coils 72a, 72b and 72c are controlled by these outputs through the control circuit of passing electricity, so that a semiconductor motor which makes the field magnet 70 rotate in the direction indicated by the arrow B is constructed. FIG. 13B is a cross sectional view of the yoke 71 of the above-mentioned shape with the same numerals. That is, the long grooves 71a, 71b and 71c are formed on the yoke 71 and the conductive portions of the armature coils are disposed in parallel to each of them. The edge portions of the conductive portions of the armature coils (the portions which do not contribute to the torque) project outside of both sides of the yoke 71. The motor is constructed in this way so that the yoke 71 can be produced by any method such as the sintering method, injection molding, or pressure molding and has an effect that the attachment of the armature coils is easy.

Figure 13A:
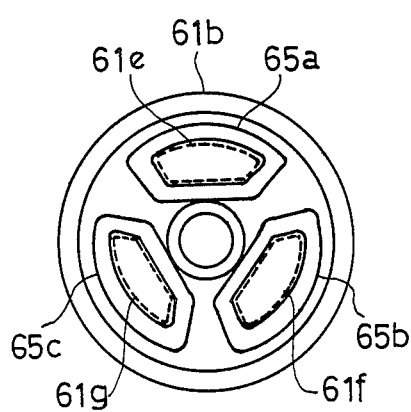
FIGS. 13A and 13B are explanatory views of the armatures.

FIG. 13A shows the armature of the example of FIG. 9, wherein projecting portions 61e, 61f and 61g, which will be the guide portions when attaching the fan-shaped armature coils 65a, 65b and 65c, are formed on the bottom surface of the casing 61b (which is also used as the yoke). This helps the armature coils to be fixed easily. The effect due to such a construction is the same as the example of FIG. 13B.

The armature coils 66 for power generation of FIG. 9 and the armature coils 74 for power generation of FIG. 10 are two-phase or three-phase armature coils, each being fan-shaped coils, and the developed views together with the field magnets (in the case of FIG. 9, the field magnet 31 is also used as such a field magnet; and in the case of FIG. 10, the magnetic poles at the right edge surface of the field magnet 70 are used as that field magnet) are entirely the same as in FIG. 12 or FIG. 21. Consequently, an inductive output can be obtained on rotating the field magnet 31 or 70. Although such in inductive output is proportional to the rotation speed, as described before, there are the defects such that the total output, of which the outputs of each of the armature coils were synthesized, includes a ripple voltage (about 15%–20%) and it has an error depending on the temperature of the magnetic field of the field magnet. According to the apparatus of the present invention, such defects are effectively eliminated.

Next, the details will be explained.

The invention will be first described for the case where the two-phase armature coils are used. When the field magnets 31 and 70 of FIGS. 9 and 10 rotate in the direction indicated by the arrow C (shown in FIG. 21), currents whose phases differ by 90° are generated in the two-phase armature coils 96a and 96b. Those waveforms are proportional to the product of the strength of the magnetic field and the rotation speed.

Next, the electric circuit shown in FIG. 19 of the apparatus of the present invention will be described.

Figure 19:
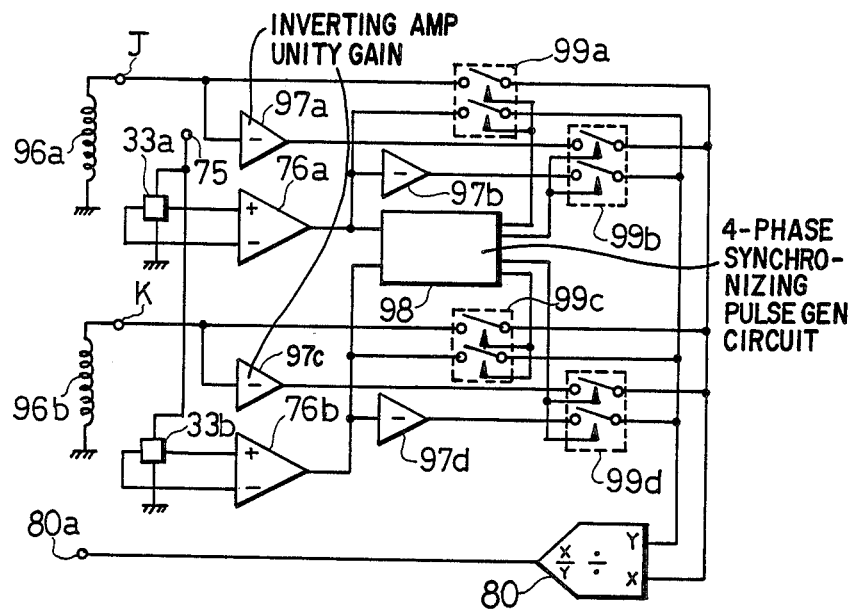
FIG. 19 is a circuit diagram illustrating further another example of the electric circuit of the apparatus of the present invention.

The armature coils in FIG. 19 are indicated by the same numerals as the armature coils 96a and 96b of FIG. 21. The power generating outputs of the armature coils 96a and 96b are as shown in the curves 108a, 108b, - - - and curves 109a, 109b, - - - which are shown in the graph (a) of the timecharts of FIG. 22. However, the inputs to analog switches 99b and 99d are inverted by inverting amplifier circuits (unity gain) 97a and 97c, and the output voltages are as shown in the curves 108a, 108b, - - - and curves 109a and 109b of the graph (a) of FIG. 22.

The outputs of the Hall elements 33a and 33b are amplified by the differential amplifying circuits 76a and 76b and the outputs are input to the four-phase synchronizing pulse generating circuit 98. Numeral 75 indicates the positive terminal for power supply.

Next, the four-phase synchronizing pulse generating circuit 98 will be described in detail with respect to FIG. 20. Numerals 97b and 97d of FIG. 19 indicate the inverting amplifier circuits having unity gain.

Figure 20:
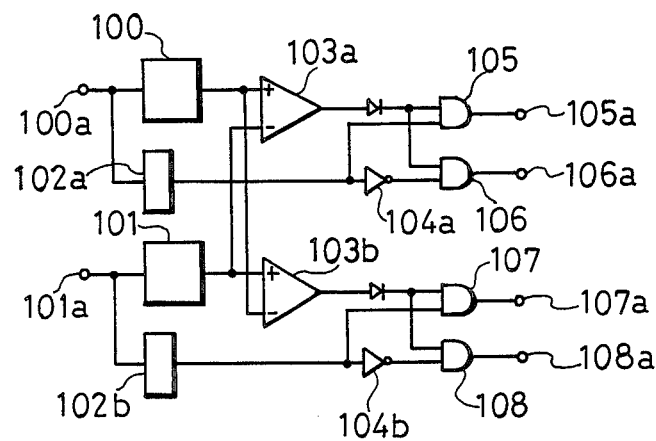
FIG. 20 is a four-phase synchronizing pulse generating circuit diagram.
Figure 22:
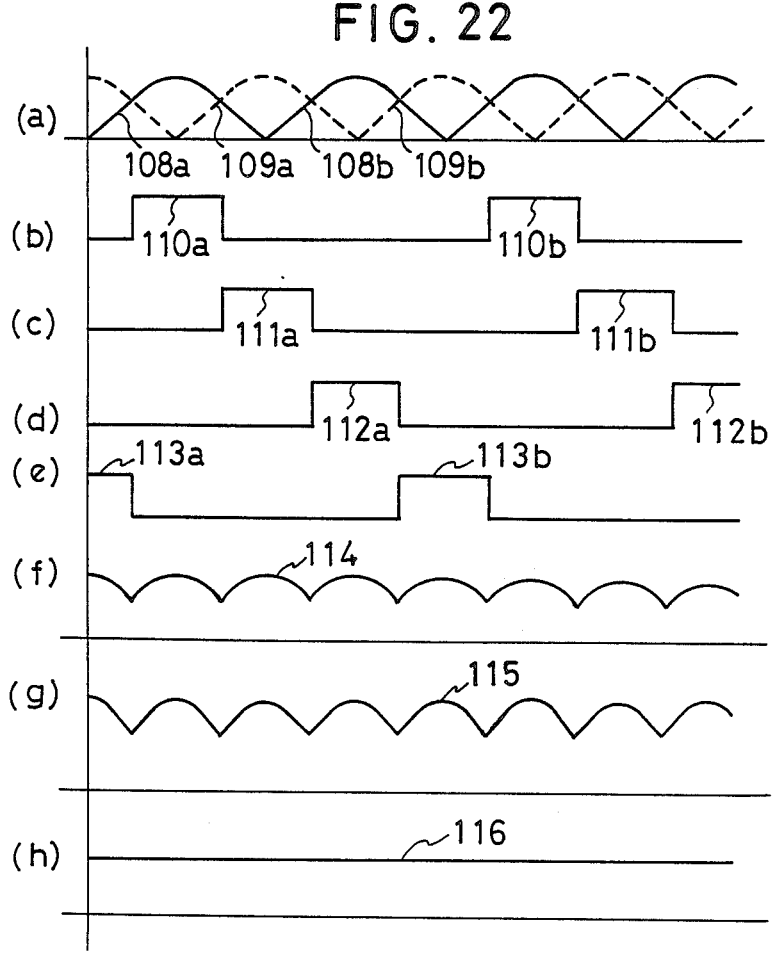
FIGS. 22(a)–(h) show timecharts of the voltages in each section of the electric circuit of FIG. 19.

In FIG. 20, the inputs to terminals 100a and 101a are the outputs of the differential amplifying circuits 76a and 76b of FIG. 19, respectively. The inputs of the terminals 100a and 101a are the two inputs of differential amplifying circuits 103a and 103b through absolute value circuits 100 and 101. Thus, the output of the differential amplifying circuit 103a is as follows. The curves of the graph (a) of FIG. 22 are considered to be the output curves of the Hall elements 33a and 33b. Therefore, the output curve of the differential amplifying circuit 103a will be both the curves 110a, 110b - - - and 112a, 112b, - - - of the graphs (b) and (d) of FIG. 22. The input of the terminal 100a is shaped into a square wave by an amplifying circuit 102a, the output becomes an input of an AND circuit 105, and then an input of an AND circuit 106 through an inverter circuit 104a. Therefore, the output of the output terminal 105a of the AND circuit 105 becomes the synchronizing pulses 110a and 110b, - - - of the graph (b) of FIG. 22, and the output of the output terminal 106a of the AND circuit 106 becomes the synchronizing pulses 112a, 112b, - - - of the graph (d) of FIG. 22.

Due to the same reason as in the above-described theory, the outputs of the terminals 107a and 108a through the differential amplifying circuit 103b, amplifying circuit 102b, inverter circuit 104b, and AND circuits 107 and 108 become the synchronizing pulses 111a, 111b - - - of the graph (c) of FIG. 22 and the synchronizing pulses 113a, 113b, - - - of the graph (e) of FIG. 22. The outputs of the terminals 105a, 106a, 107a, and 108a become the control inputs respectively of the analog switches 99a, 99b, 99c, and 99d of FIG. 19. Consequently, the inductive outputs of the armature coils 96a and 96b are synchronizingly rectified by the output of the four-phase synchronizing pulse generating circuit 98 of FIG. 19 through the analog switches 99a, 99b, - - - and become as shown in the curve 115 of the graph (g) of FIG. 22. In the same manner, the outputs of the Hall elements 33a and 33b are also synchronizingly rectified and become as shown in the curve 114 of the graph (f) of FIG. 22. The output of the above-mentioned curve 115 of the graph (g) is input to the X terminal of the dividing circuit 80 and the output of the curve 114 of the graph (f) is input to the Y terminal of the dividing circuit.

The input voltage $E_7$ of the X terminal of the dividing circuit 80 is expressed as $$E_7 = K_5 N(H_1 + H_2),$$

where $K_5$ is a constant and N indicates the rotation speed of the field magnet (rotor). $H_1$ and $H_2$ indicate the strengths of the magnetic fields which pass through the armature coils 96a and 96b, respectively, and ($H_1+H_2$) shows the curve 115 of the graph (g) of FIG. 22.

The input voltage $E_8$ of the Y terminal of the dividing circuit 80 is expressed as $$E_8 = K_6(H_1+H_2),$$

where $K_6$ is a constant and $H_1$ and $H_2$ indicate the strengths of the magnetic fields which pass through the Hall elements 33a and 33b, respectively. It is necessary that these magnetic fields be identical to the magnetic fields which pass through the above-described armature coils or that they comply with the magnetic field distribution curve in proportion to them. ($H_1+H_2$) shows the curve 114 of the graph (f) of FIG. 22.

The output voltage $V_3$ of the output terminal 80a of the dividing circuit 80 is expressed as $$V_3 = \frac{K_5}{K_6} \cdot N,$$

thus the voltage $V_3$ is proportional to the rotation speed and this waveform becomes the curve 116 of the graph (h) of FIG. 22. The property of this curve has the effect such that the output does not include the ripple voltage ($H_1+H_2$) is eliminated and no smoothing circuit is included, so that an output voltage having good responsiveness in proportion to the rotation speed can be obtained.

When the field magnet is inverted, the output voltages of the armature coils 96a and 96b are inverted although the outputs of the Hall elements 33a and 33b do not change, so that the output of the dividing circuit 80, which is a two-quadrant dividing circuit, also becomes negative; thus, it is possible to discriminate the rotating direction.

In the above-mentioned example, the two-phase armature coils were described, however, in the case of three-phase armature coils, for example, in the case of the three-phase armature coils described before with respect to FIG. 12, it is possible to achieve the object by constituting an electric circuit which functions similarly to that of FIG. 19 by using the armature coils 66a, 66b and 66c (armature coils for power generation indicated by the numeral 66 in FIG. 9) which were disposed in substantially the same way as the armature coils 65a, 65b and 65c of FIG. 12 instead of the armature coils 96a and 96b of FIG. 19 and by using the Hall elements 33a, 33b and 33c corresponding to the armature coils of each phase as the Hall elements.

The same object can also be achieved by using the armature coils 96a and 96b (FIG. 19) of a bi-core winding type and then energizing the one side of each of the coils.

As described later with respect to FIG. 17, the same object can be achieved by adding each output of the Hall elements and each output of the armature coils respectively using the adders and then by dividing the two outputs of the adders.

Figure 15:
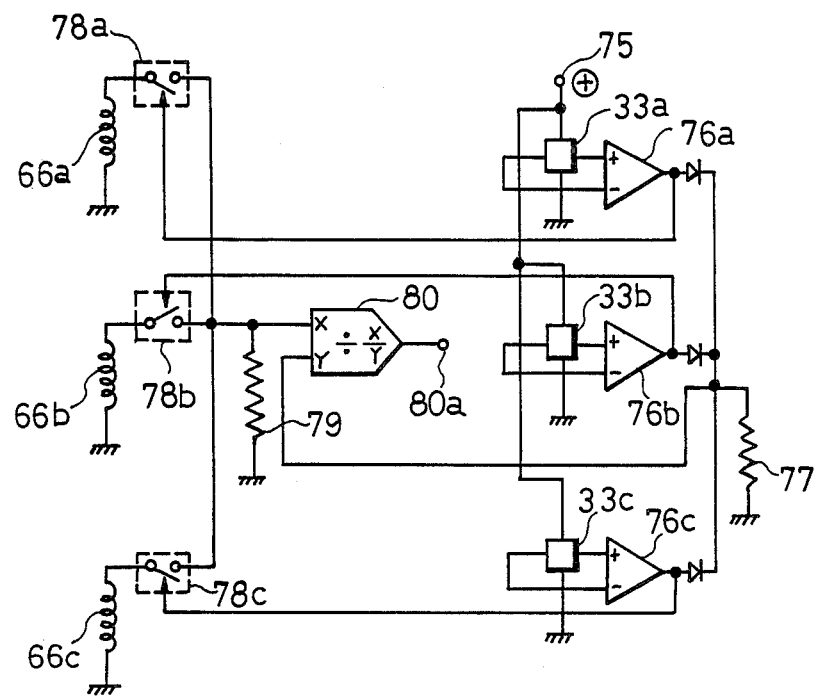
FIG. 15 is an electric circuit diagram of another example of the apparatus of the present invention.

FIG. 15 shows the electric circuit of another example of the invention, wherein the armature coils (for power generation) 66a, 66b and 66c are the above-mentioned three-phase armature coils.

The outputs of the Hall elements 33a, 33b and 33c are amplified by the differential amplifying circuits 76a, 76b and 76c, respectively, and only the positive half-waves cause voltage drops in a resistor 77 through the diodes. Numeral 75 indicates the positive voltage terminal. The analog switch 78a is closed only by the positive half-wave of the output of the Hall element 33a and a voltage drop occurs in a resistor 79 by the inductive output of the armature coils 66a. In the same manner, with respect to the armature coils 66b and 66c and the analog switches 78b and 78c, a voltage drop occurs in a resistor 79 by only the positive half-waves of the Hall elements 33b and 33c. The voltage drops of the resistors 77 and 79 are input to the Y and X terminals of the dividing circuit (two-quadrant) 80.

Figure 16:
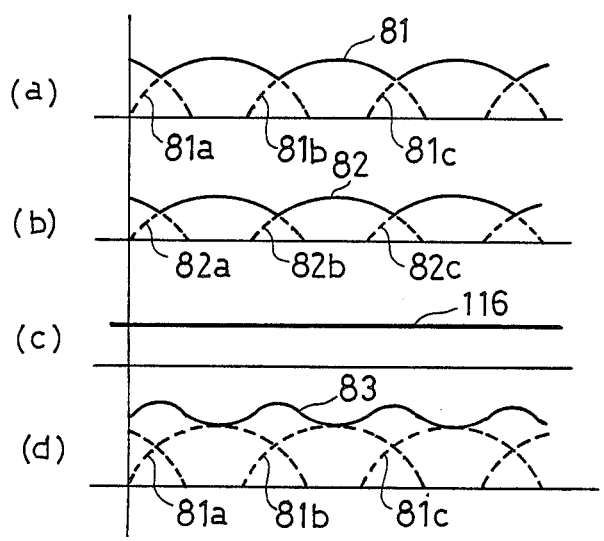
FIGS. 16(a)–(d) show timecharts of the voltages in each section of the electric circuit of FIG. 15.

The curves 81a, 81b and 81c of the graph (a) of the timecharts of FIG. 16 are the output curves of the analog switches 78a, 78b and 78c and the curve 81 indicated by the solid line shows the voltage drop $E_7$ of the resistor 79, which corresponds to the above-mentioned equation $$E_7 = K_5 N(H_1+H_2+H_3),$$

where $H_3$ indicates the strength of the magnetic field which passes through the armature coils 66c.

The curves 82a, 82b and 82c of the graph (b) of the timecharts show the output voltages of the differential amplifying circuits 76a, 76b and 76c and the curve 82 shown by the solid line indicates the voltage drop $E_2$ of the resistor 77, which corresponds to the afore-mentioned equation $$E_8 = K_6(H_1+H_2+H_3).$$

The expression ($H_1+H_2+H_3$) doesn't mean a simple addition but means that the same kind of additions are done. Therefore, the output voltage $V_3$ at the output terminal 80a of the dividing circuit 80 is expressed as $$V_3 = \frac{K_5}{K_6} \cdot N.$$

Thus, it is proportional to the rotation speed while having no ripple voltage as shown in the curve 116 of the graph (c) of FIG. 16. When the rotation of the rotor is reversed, the direction for energization of the resistor 79 is also reversed, so that the output at the terminal 80a also changes to negative; therefore, it is possible to discriminate the forward or reverse direction of the rotation. If it is not necessary to discriminate the forward or reverse direction, diodes may be used instead of the analog switches 78a, 78b and 78c. The effects of this example are the same as the previous example.

Figure 17:
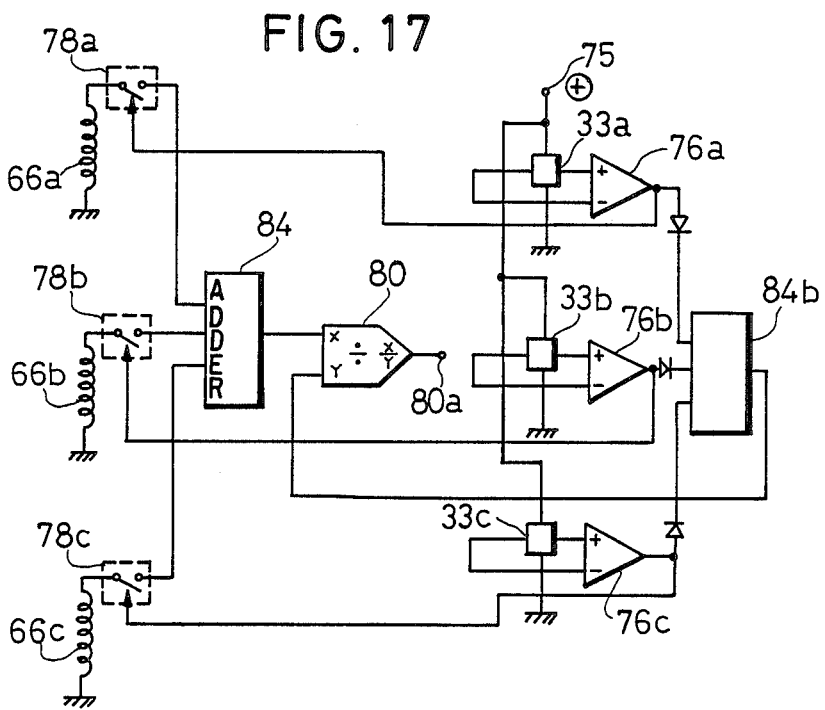
FIG. 17 is a circuit diagram illustrating another example of the electric circuit of the apparatus of the present invention.

Next, FIG. 17 shows a variation of the electric circuit of FIG. 15, the parts indicated by the same numerals as in FIG. 15 are the same parts; descriptions thereof are omitted.

The output voltages of the analog switches 78a, 78b and 78c are added by the adder 84a. This added result is shown in the graph (d) of FIG. 16. That is, the curves 81a, 81b and 81c indicate the output voltages of the analog switches 78a, 78b and 78c and the output of the adder 84a is shown in the curve 83 indicated by the solid line.

Since the output voltage of the adder 84b represents the sum of the output voltages of the Hall elements 33a, 33b and 33c, it exhibits a curve which is similar to the graph (d) of FIG. 16.

The output voltage $E_7$ of the adder 84a is expressed as $$E_7 = K_5 N(H_1+H_2+H_3).$$

The output voltage $E_8$ of the adder 84b is expressed as $$E_8 = K_6(H_1 + H_2 + H_3).$$

Thus, the output voltage $V_3$ of the dividing circuit 80 is expressed as $$V_3 = \frac{K_5}{K_6} \cdot N.$$

Thus, the same effect as in the previous example can be obtained.

When the rotation of the rotor is reversed, the output of the adder 84a becomes a negative voltage, so that the output of the dividing circuit 80 also becomes a negative voltage and it is possible to discriminate the forward or reverse direction of the rotation. In each of the above-described examples, the Hall elements 33a, 33b and 33c are also used for the armature coils for obtaining the driving torque; however, they may be provided independently.

The apparatus of the present invention, whose electric circuits were described with respect to FIGS. 15, 17 and 19, detects the rotation speed by separately providing the armature coils to be the power generation coils. The armature coils 66 of FIG. 9 and the armature coils 74 of FIG. 10 are used for power generation; therefore, they are independently provided regardless of the provision of armature coils 65 (FIG. 9) and the provision of armature coils 72 (FIG. 10) for obtaining the driving torque.

However, it is also possible to obtain the above-mentioned voltage $E_7$ by taking out the counter-electromotive force using the armature coils for obtaining the driving torque. An example for this purpose will be explained hereinbelow with respect to FIGS. 18A, 18B and 18C.

The motor shown in FIG. 10 is used in this case and the armature coils 74 and yoke 73 are removed.

Figure 18A:
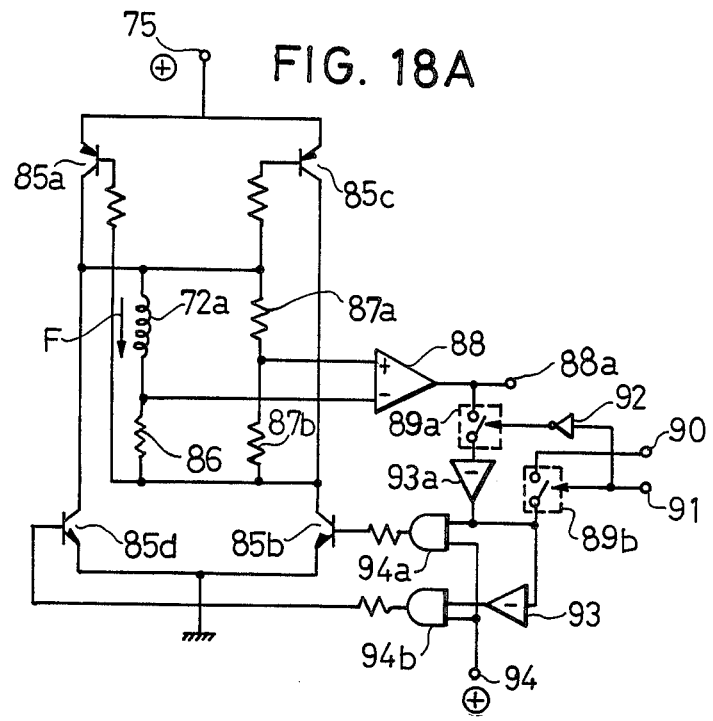
FIGS. 18A, 18B and 18C are circuit diagrams illustrating further another example of the electric circuit of the apparatus of the present invention.

The electric circuit of FIG. 18A is the control circuit of passing electricity concerning the armature coils 72a which are one of the three-phase armature coils 72a, 72b and 72c. Transistors 85a, 85b, 85c and 85d constitute a bridge circuit, and the bridge circuit comprising the armature coils 72a and the resistors 87, 87B and 86 is connected to the opposite sides thereof.

When the input voltage at the terminal 91 is at a high level, the analog switch 89b is closed. The output of the Hall element 33a is input from the terminal 90 through the differential amplifying circuit (such as indicated by numeral 76a of FIG. 15). The input voltage at the terminal 94 is also at a high level. Therefore, in case of the positive output of the differential amplifying circuit by the output of the Hall element 33a, the output is obtained from the AND circuit 94a, so that the transistor 85b conducts. Therefore the base input of the transistor 85a is obtained and the transistor 85a conducts, so that the armature coils 72a are energized in the direction indicated by the arrow F.

In case of the negative output of the differential amplifying circuit by the Hall element 33a, there isn't the output of an AND circuit 94a, and an input of an AND circuit 94b becomes positive through an inverter circuit 93, so that the output is obtained and the transistor 85d conducts. Therefore, the base input of the transistor 85c is obtained and the transistor 85c conducts, so the armature coils 72a are energized in the opposite direction to that indicated by the arrow F.

As will be understood from the above description, the armature coils 72a are energized in both directions each time when the Hall element 33a is respectively in the magnetic fields of N and S polarities, so that a unidirectional driving torque occurs.

Since the control circuit of passing electricity of the same construction is provided with the armature coils 72b and 72c, they are energized in both directions by the outputs of the Hall elements 33b and 33c, respectively, and unidirectional driving torque occurs. Consequently, the apparatus can be driven as a three-phase Hall motor.

When the input at the terminal 91 is changed to a low level during running, the analog switch 89b is opened and the positive control input is applied to the analog switch 89a through the inverter circuit 92, so it is closed. Consequently, the following operations are done. That is, since the bridge circuit comprising the resistors 87a, 87b and 86 and the armature coils 72a is adjusted so that it balances while the motor stops, therefore, the circuit is constructed such that when the motor rotates, a voltage in proportion to the rotation speed is input to the differential amplifying circuit 88. Consequently, from the output of the differential amplifying circuit 88, a positive output voltage in proportion to the strength of the magnetic field is obtained when the armature coils 72a are energized in the direction indicated by the arrow F, and a negative output voltage from the differential amplifying circuit 88 which is proportional to the strength of the magnetic field is obtained when the coils 72a are energized in the direction opposite that indicated by the arrow F. Such output is input to the AND circuits 94a and 94b through the analog switch 89a. Thus, when the armature coils 72a are energized in the direction indicated by the arrow F, the output of the AND circuit 94b is obtained through the inverting amplifier circuits 93 and 93a having unity gain, so the transistors 85c and 85d conduct and the armature coils 72a are energized in the opposite direction to that indicated by the arrow F. Therefore, the output torque is inverted to apply rapid braking. At this time, the counter-electromotive force is applied and the large current of the armature coils flows, this causes a further voltage drop at the point G. Thus, the above-described control is continued. When the armature coils come under the next magnetic pole, the direction of the counter-electromotive force is reversed and the current of the armature decreases suddenly, then the voltage at the point G increases over the voltage at the point H, so that the output of the differential amplifying circuit 88 becomes negative. Thus, the output of the AND circuit 94b disappears, the output of the AND circuit 94a is obtained, and the transistors 85a and 85b conduct.

Consequently, the torque in the reverse direction occurs again and braking is maintained or the speed is reduced rapidly; however, when the speed becomes low and the counter-electromotive force disappears, the above-mentioned braking function automatically disappears and stops.

As described above, by selecting the input voltage at the terminal 91, which is at a high level or at a low level, it is possible to freely select either driving or braking. Moreover, there is an effect such that since the braking force is so large that it is possible to obtain an apparatus in which the braking function automatically stops when the motor stops.

In the case that the motor is being run by the occurrence of the driving torque, the output voltage of the terminal 88a is the counter-electromotive force in proportion to the rotation speed. The other armature coils 72b and 72c are also provided with the control circuit of passing electricity similar to FIG. 18A, and the same function and effect can be obtained. It is needless to say that the terminals 94 and 91 are all a common terminal. In the case of the two-phase armature coils, the two control circuits of passing electricity of FIG. 18A may be used. Another means may be used as the bridge circuit for obtaining the counter-electromotive force of the armature coils 72a.

The above-mentioned output voltage at the terminal 88a will be described. For example, the afore-described electric circuit of FIG. 19 is explained. The object of the present invention can be achieved by removing the armature coils 96a and 96b, then inputting the output of the terminal 88a to the terminal J of FIG. 19 and inputting the corresponding counter-electromotive force output of the control circuit of passing electricity of the armature coils 72b from the terminal K. In this case, the two-phase armature coils are used. In the case of using the three-phase armature coils, a similar electrical circuit may be added. The Hall elements 33a and 33b used in FIG. 19 are the elements which are also used commonly as the input of the terminal 90 in FIG. 18A.

It is possible to achieve the object of the invention even if the control circuit of passing electricity of FIG. 18A is provided with the electric circuits of FIGS. 15 and 17. To take for example the circuit of FIG. 17, the armature coils 66a, 66b and 66c of FIG. 17 are removed, the output of the terminal 88a of FIG. 18A is used as the input on the left side of the analog switch 78a of FIG. 17, and the output from the output terminal corresponding to the terminal 88a of the control of passing electricity of the other armature coils 72b and 72c is used as the input on the left side of the analog switches 78b and 78c of FIG. 17, so that the object of the present invention can be achieved.

As will be understood from the above description, there are characteristics such that by using the counter-electromotive forces of the armature coils for driving and the outputs of the Hall elements which are the position detecting elements, it is possible to detect the rotation speed and to drive as a Hall motor, moreover, it is also possible to apply rapid braking if necessary. Therefore, there is an effect that it is possible to obtain the optimum semiconductor motor as a servo motor.

In FIG. 18A, the differential voltage between the terminals G and H is proportional to the counter-electromotive force; however, there is a defect that an error occurs due to the temperature dependent property of the resistance of the copper wires of the armature coils 72a. This may be a problem since the temperature coefficient of the copper wire increases by 0.4% for an increase of one degree. This cannot be neglected in the case of using an excessively larger armature current. Since the apparatus of the present invention uses the dividing circuit mentioned above, the term corresponding to the strength of the magnetic field due to the field magnet disappears, so that there is an advantage that the temperature dependent property will not be affected by such magnetic field strength.

Figure 25:
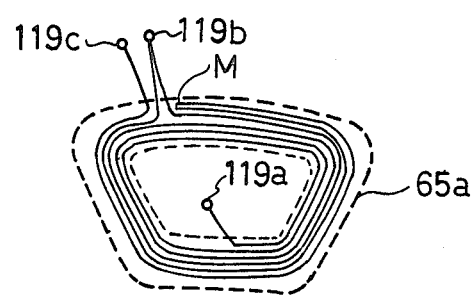
FIG. 25 is an explanatory view of an example of the armature coil.
Figure 26A:
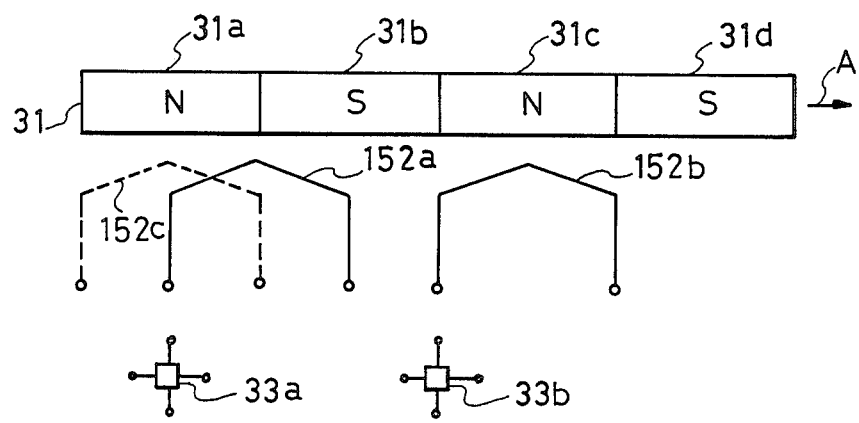
FIGS. 26A and 26B are developed views of the field magnets and armature coils.
Figure 26B:
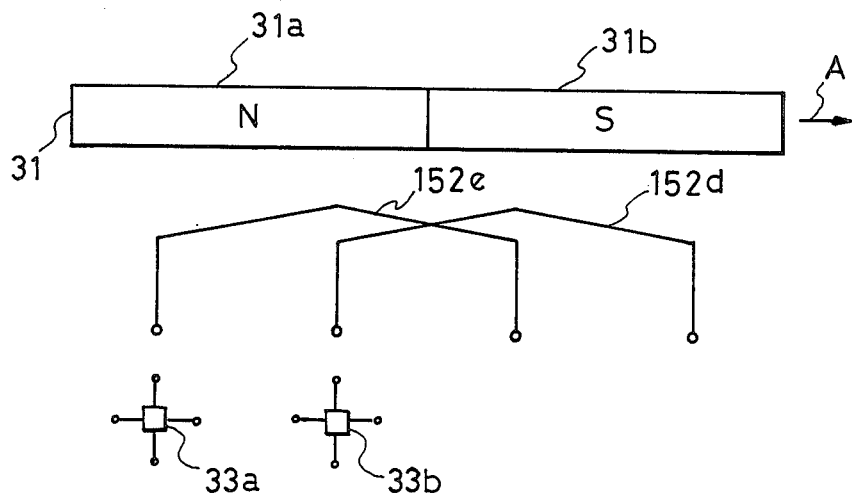

With reference to FIG. 25, the means will be explained by which the above-mentioned temperature dependent property of the armature coils is eliminated.

In FIG. 25, numeral 65a indicates the armature coils designated by the same numeral as in FIG. 12, which coils are wound in a fan-shape. The armature coils of FIG. 18A are wound in a rectangular shape. Both of them may be applied. The wires are frame-wound from the starting point of the terminal 119a and when the wires are wound with the desired number of windings, the intermediate terminal 119b is taken out. Next, they are wound in the same direction the desired number of windings, then turned back at the point indicated at M and the wires are again wound in the opposite direction the same number of windings, then the terminal 119c is taken out. The coils between the terminals 119a and 119b are energized to become the section for generating the driving torque. Since the coils between the terminals 119b and 119c are non-inductive windings, no counter-electromotive force occurs, so that this section functions merely as a resistor. To take the example of FIG. 18A, the coils between the terminals 119a and 119b of FIG. 25 are used as the armature coils 72a for driving and the coils between the terminals 119b and 119c are used as the resistor 86 of FIG. 18A. The terminal 119b corresponds to the terminal G of FIG. 18A. In accordance with such a means, there is an effect that a counter-electromotive force without error can be derived since when the temperature of the armature coils 72a (65a) increases, the temperature of the resistor 86 also becomes the same temperature as the coils 72a and the temperature coefficients are also identical, so the balanced condition of the bridge circuit is always maintained. Next, FIG. 18B will be explained.

Figure 18B:
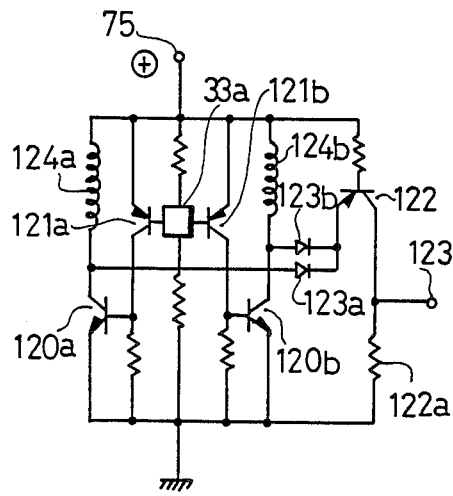
Figure 18C:
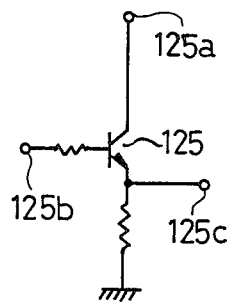

In FIG. 18B, armature coils 124a and 124b are disposed in the same positions of the armature and they are alternately energized corresponding to whether transistors 120a and 120b connected in series to them are conducting or not. While the Hall element 33a is in the magnetic field of N polarity, the transistors 121a and 120a conduct to energize the armature coils 124a. While Hall element 33a is in the magnetic field of S polarity, the transistors 121b and 120b conduct to energize the armature coils 124b.

The armature coils 124a and 124b are of the bi-core winding type, and the single-phase armature coils are energized in both directions, so that a corresponding output torque is obtained. The armature coils of another phase are also energized by substantially the same control circuits of passing electricity, and a semiconductor motor which generates the driving torque is obtained.

As will be understood from the energization control mentioned above, the armature coils 124a and 124b are disposed in the same positions of the armature. Therefore, while the armature coils 124a are energized, a voltage in proportion to the rotation speed and the strength of the related magnetic field is obtained through a diode 123b. While the armature coils 124b are energized, an output corresponding to the counter-electromotive force is obtained through a diode 123a. These output voltages are amplified by a transistor 122 and obtained from the terminal 123 as the voltage drop of a resistor 122a. To take the example of the two-phase armature coils, the output voltage of the terminal 123 is as shown in the graph (a) of FIG. 22. The solid lines 108a, 108b, - - - show the output voltages obtained through the diode 123b and the dotted lines 109a and 109b show the output voltages obtained through the diode 123a. Consequently, the object of the present invention can be achieved by using an electric circuit similar to the electric circuit of FIG. 19. By using only the output of either of the diodes 123a and 123b of FIG. 18B, those output voltages are entirely the same as the armature coils 66a, 66b and 66c for power generation of FIG. 17. Thus, the object of the invention can be achieved by using the outputs obtained through the three diodes corresponding to each phase as the inputs on the left sides of the analog switches 78a, 78b and 78c of FIG. 17, respectively.

Next, FIG. 23 will be explained.

The output voltage $E_7$ of the armature coils for power generation described above is expressed as $$E_7 = K_5 N(H_1 + H_2 + H_2) \quad (1)$$

and the output voltage $E_8$ of the Hall element is expressed as $$E_8 = K_6(H_1 + H_2 + H_3) \quad (2)$$

and the rotation speed N is obtained by the dividing circuit. However, it is necessary to meet the condition that $(H_1 + H_2 + H_3)$ of the expressions (1) and (2) are completely identical. However, they are not precisely identical but approximately equal. This is because of the following reason. For example in the developed view of FIG. 12, the conductive portions on both sides of the armature coils 65a are in both the magnetic fields of N and S polarity, so that the generated output is the sum of them. However, the output of the Hall element 33a is obtained due to the magnetic field of the pole on one side. Therefore, the outputs of the two are not precisely identical, so there is a case that $(H_1 + H_2 + H_3)$ does not disappear completely from the output of the dividing circuit.

To solve such a problem, the two Hall elements are united as one and these Hall elements are also disposed to the position indicated by the dotted line 75d of FIG. 12, and the sum of the outputs of both the Hall elements may be used. In like manner, each pair of the other Hall elements 33b and 33c is used.

As another means, it is possible to achieve the object by using the generated power of only the conductors on each one side of the armature coils 65a, 65b and 65c. Such means will be explained with respect to FIGS. 23 and 24.

Figure 23:
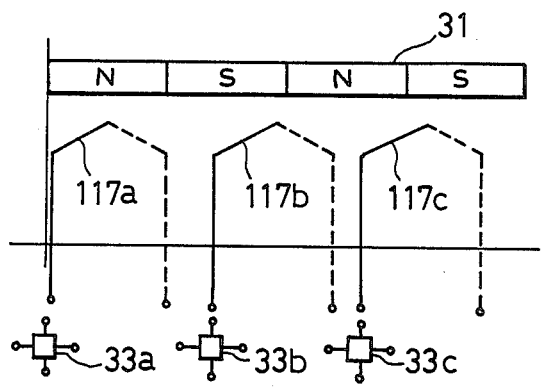
FIG. 23 is a developed view of the field magnet and armature coils of further another example of the apparatus of the present invention.
Figure 24:
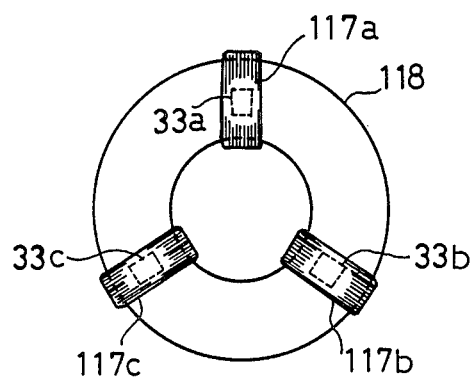
FIG. 24 is an explanatory view of the armature of FIG. 23.

In FIG. 24, armature coils 117a, 117b and 117c are attached to a torodial yoke 118 (of a magnetic substance without eddy-current loss, e.g. soft ferrite) at an open angle of 120°. The rotor which is the field magnet is provided over the upper surface of the yoke 118 of FIG. 24 (in the drawing, the front surface side of the paper) with a space, its magnetic field is closed through the yoke 118. Therefore, the apparatus has a construction similar to a motor of the axial cavity type of the same structure. The developed views of them are shown in FIG. 23. The field magnet 31 is magnetized into N and S polarities at an open angle of 90° and is of the torodial type, and is magnetized in the axial direction. The magnetic flux penetrates the conductive portions on the upper surfaces of the armature coils 117a, 117b and 117c (in FIG. 24, the portions which are on the front surface side of the paper) and passes through the yoke, then it is closed. Therefore, it is constructed so that the magnetic flux doesn't penetrate the conductive portions on the bottom surfaces of the armature coils 117a, 117b and 117c (in FIG. 24, the portions which are on the rear surface side of the paper).

As described above, the conductive portions through which the magnetic flux penetrates are shown by a solid line in FIG. 23 and the portions through which the magnetic flux doesn't penetrate are shown by a dotted line.

According to the above-described construction, the positions of the conductive portions which are effective for power generation of the armature coils completely agree with those of the Hall elements 33a, 33b and 33c; thus, the above-described defects can be eliminated. In FIG. 24, the Hall elements 33a, 33b and 33c are fixedly attached to the same positions as the conductive portions which are effective for power generation. In this case, it is desirable that the widths of the sensitive sections of the Hall elements should agree with the widths of the armature coils.

Any electric circuit of FIGS. 15, 17 and 19 described before may be applied for the processing of the outputs of the armature coils 117a, 117b and 117c. As described above, the armature of FIG. 16 is also effective as a single tachogenerator; furthermore, it is possible to achieve the object of the present invention by placing the armature of FIG. 24 at the positions of the yoke 73 and armature coils 74 of FIG. 10.

FIGS. 26 to 32 show another example of the electric circuit of the rotation detecting apparatus according to the present invention. The field magnet and armature coils shown in FIG. 26 to be used in this example have the same constructions as those shown in FIG. 4 or FIG. 7. In the drawings, the parts indicated by the same reference symbols or numerals as those in FIGS. 4 and 7 indicate the same functions or same parts. Numerals 152a, 152b, - - - show the armature coils.

Figure 27A:
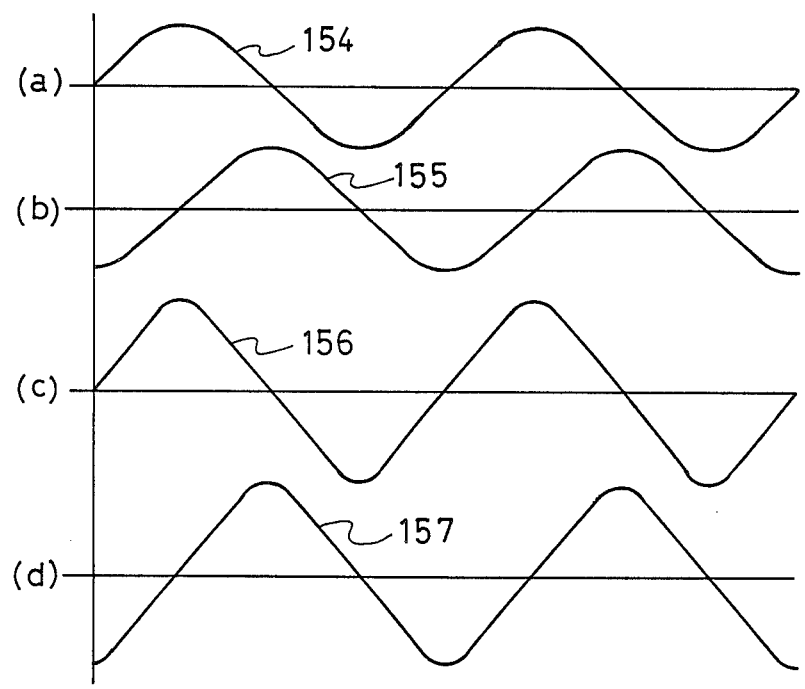
FIGS. 27A–27D are timecharts of the voltage curves at each section of the electric circuit shown in FIG. 21 through FIG. 27.
Figure 28:
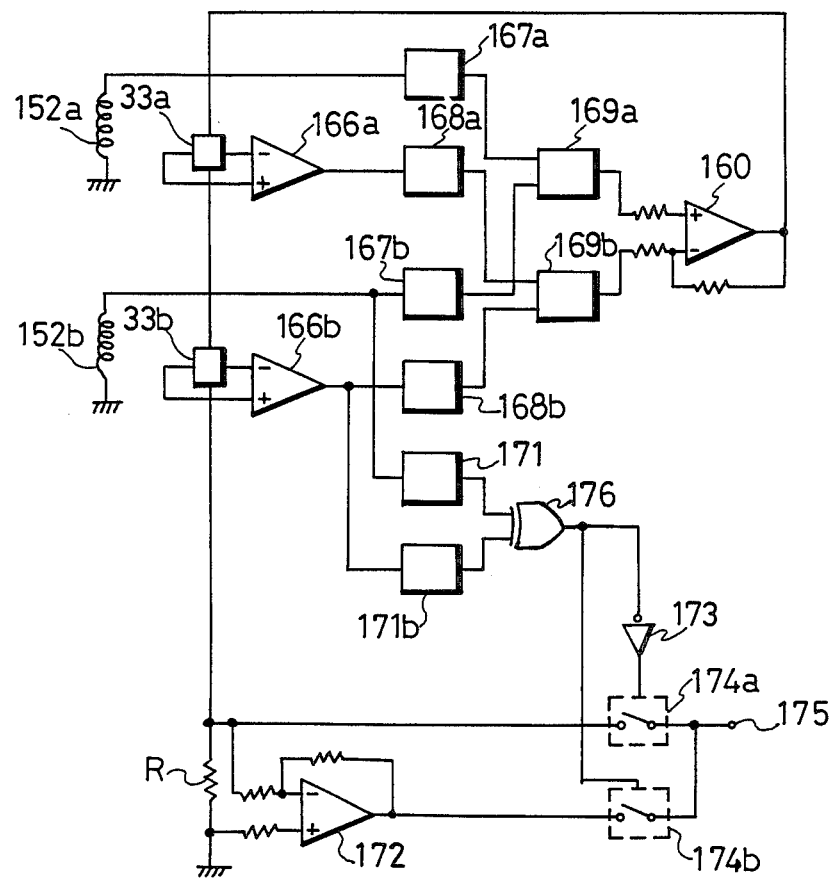
FIG. 28 is a circuit diagram illustrating another example of the electric circuit of the apparatus of the present invention.

The generated output of the armature coils 152a are input to an absolute value circuit 167a of FIG. 28, which output is as shown in the curve 154 of the graph (a) of the timechart shown in FIG. 27A. The generated output of the armature coils 152b are input to an absolute value circuit 167b, which output is as shown in the curve 155 of the graph (b) of FIG. 27A. Assuming that the strengths of the magnetic fields which penetrate the armature coils 152a and 152b are referred to as $H_1$ and $H_2$, respectively, the curve 154, i.e. the input voltage $E_{11}$ of the absolute value circuit 167a is expressed as $$E_{11} = K_{11} N H_1 \text{ (N indicates the rotation speed of the field magnet.)}$$

The input voltage $E_{12}$ of the absolute value circuit 167b is likewise expressed as $$E_{12} = K_{11} N H_2.$$

The electrical constants of the armature coils 152a and 152b are equal, so constant $K_{11}$ is common.

The output current of an error amplifier 170 described later flows through the Hall elements 33a and 33b indicated by the same numerals in FIGS. 4 and 28. Each output is amplified by the differential amplifiers 166a and 166b and input to the absolute value circuits 168a and 168b, respectively. The curves of such input voltages are shown in the curves 166 and 167 of the graphs (c) and (d) of FIG. 27. The voltages $E_{13}$ and $E_{14}$ of the curves 166 and 167 (the values of the axis of ordinate) are expressed as $$E_{13} = K_{12} H_1 I, E_{14} = K_{12} H_2 I$$

(Where I indicates the current which flows into the Hall elements 33a and 33b and constant $K_{12}$ is set so that it is common to both expressions).

Figure 27B:
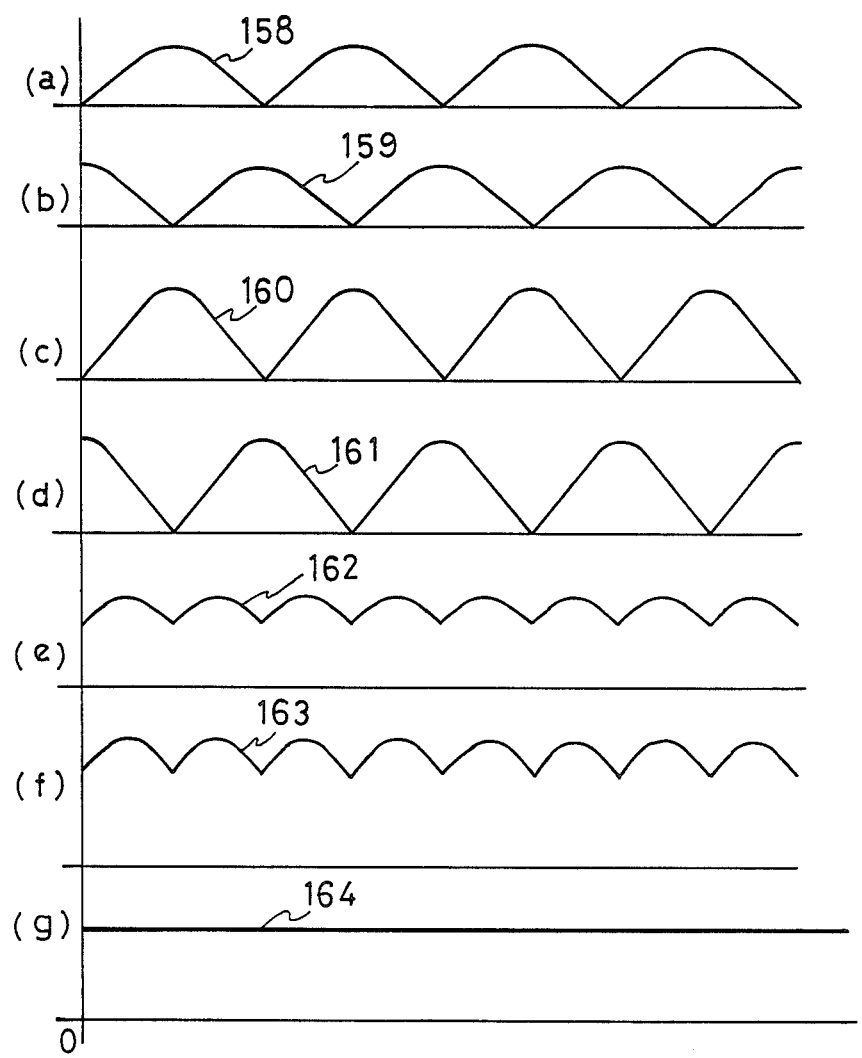

The outputs of the absolute value circuits 167a and 167b of FIG. 28 are as shown in the curves 168 and 169 of the graphs (a) and (b) of FIG. 27B, respectively. The outputs of the absolute value circuits 168a, 168b are as shown in the curves 160 and 161 of the graphs (c) and (d) of FIG. 27B. That is, the curves 154, 155, 156 and 157 which show the AC waveforms input to each absolute value circuit are converted into the curves 158, 159, 160, and 161 which show the waveforms which are fullwave rectified, respectively.

Next, each output of the above-mentioned absolute value circuits 167a and 167b is input to the adder 169a to obtain the added output $E_{15}$. The waveform of added output $E_{15}$ is shown in the curve 162 of the graph (e) of FIG. 27B. Since the value of the added output $E_{15}$ is the value of the outputs of the absolute value circuits added, we have $$E_{15} = |E_{11}| + |E_{12}| = K_{11}|N|(|H_1| + |H_2|)$$

On the other hand, each output of the above-mentioned absolute value circuits 168a and 168b is input to the adder 169b to obtain the added output $E_{16}$, the waveform of which added output $E_{16}$ is shown in the curve 163 of the graph (f) of FIG. 27B, and its value is expressed as $$E_{16} = |E_{13}| + |E_{14}| = K_{12}I(|H_1| + |H_2|)$$

Next, the two added outputs $E_{15}$ and $E_{16}$ mentioned above are input to the error amplifier 170; however, the error amplifier 170 functions so that $E_{15}$ agrees with $E_{16}$, so in this case $E_{15}$ and $E_{16}$ become identical and the following expression is obtained. That is, If $E_{15} = E_{16}$, $$K_{11} \cdot |N| \cdot (|H_1| + |H_2|) = K_{12}I(|H_1| + |H_2|)$$

Therefore, the output current I of the error amplifier 170 is expressed as $$I = (K_{11}/K_{12}) \cdot |N|.$$

Thus, the value is proportional to only the number of rotations N, not to the strength of the magnetic field. The waveform of the related output current I is shown in curve 164 of the graph (g) of FIG. 27B.

The output current I is supplied as the control current of the Hall elements 33a and 33b.

The current I supplied to the Hall elements 33a and 33b causes a voltage drop V across the detection resistor R connected between the control current output terminal of the Hall element 33b and ground. This voltage drop V is expressed as $$V = IR = (K_{11}/K_{12}) \cdot |N| \cdot R,$$

so it is proportional to the number of rotations; thus, it can be the rotation speed signal.

The rotation speed signal V, detected across the detection resistor R becomes the input signal of the analog switch 174a, and on the other hand, it also becomes the input signal of the analog switch 174b after being changed to $-V$ through an inverting amplifier circuit 172. If the above analog switch 174a is closed, the signal V is output from the final output terminal 175 and if the above analog switch 174b is closed, the signal $-V$ is output therefrom. The analog switches 174a and 174b are constructed so that they are not closed simultaneously; when the field magnet 31 is rotating in the direction indicated by the arrow A (forward rotation), the analog switch 174a is closed, and at the time of the reverse rotation, the analog switch 174b is closed.

The operations of the above-mentioned analog switches will be described in detail hereinbelow. The signals $E_{12}$ and $E_{14}$ to be input to the absolute value circuits 167b and 168b are input to waveform shaping circuits 171a and 171b and shaped into square waves, respectively. These square waves are as shown in the curves 183 and 184a of the graphs (a) and (b) of FIG. 27C. ($E_{14}$ corresponds to the curve 183 and $E_{12}$ corresponds to the curve 184a.) The waveform 184a is obtained by shaping the generated output from the armature coils 152b in the case that the field magnet 31 rotates in the direction indicated by the arrow A. The square wave after being shaped is as shown in the curve 184b of the graph (c) of FIG. 27C in the case that the field magnet 31 rotates in the reverse direction.

In the case that the two signals which were waveform shaped are input to an exclusive OR circuit 176, the output of this circuit 176 assumes a low level since the curves 183 and 184a are combined during the forward rotation and the two signals always agree with each other. Thus, the analog switch 174b among the analog switches 174a and 174b (which are closed when the control terminal exhibits a high level) is opened, and the switch 174a is closed since it is provided with the inverter circuit 173 at the front stage of the control terminal.

When the analog switches 174a and 174b are closed and opened, respectively, the output signal ($-V$) from the above inverting amplifier 172 is cut and the signal V is output to the output terminal 175.

Figure 27C:
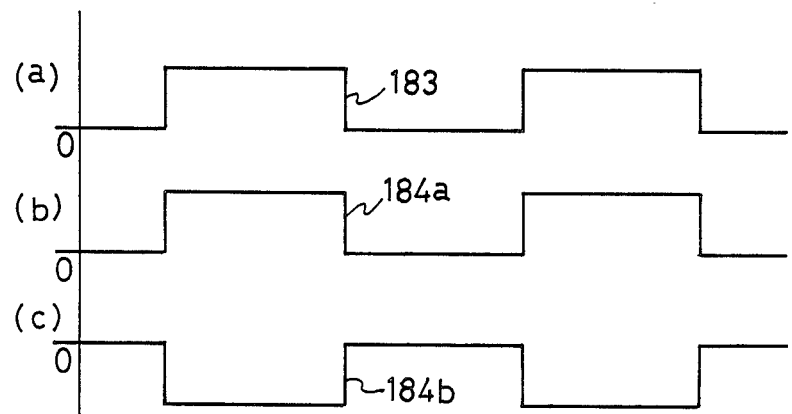

When the field magnet 31 is inverted, the output waveform of the above-mentioned waveform shaping circuit 171a becomes the waveform of the curve 184a inverted as shown in the curve 184b of the graph (c) of FIG. 27C. This output signal always disagrees with the curve 183 and the output of the exclusive OR circuit 176 assumes a high level, so that an operation which is opposite to the operation mentioned before is executed and the analog switches 174a and 174b are opened and closed, respectively. Therefore, the output signal ($-V$) from the inverting amplifier 172 is output to the output terminal 175.

From the above explanation, according to the circuit shown in FIG. 28, a rotation speed signal in proportion only to the number of rotations but, which does not include the ripple voltage, is obtained and it is also possible to detect the rotating direction simultaneously by whether the voltage is positive or negative.

The operation principle of the apparatus of the present invention is as described above. In FIG. 27, adders 169a and 169b add each output of the absolute value circuits. In case of adding the curves 158-161 shown in the graphs (a)-(d) of FIG. 27B, an error occurs near the valley points (near the zero volt points) if the offset voltage for the Hall elements and the absolute value circuits is not proper. Since this error occurs in the portion where the absolute value of the output is small, it is considered that its influence cannot be neglected. Next, an example will be explained with respect to FIG. 29, in which the object is achieved by using only the relatively large output portion. As described before, the same designations are given to the same functions or the same parts in the circuit of FIG. 28.

Figure 29:
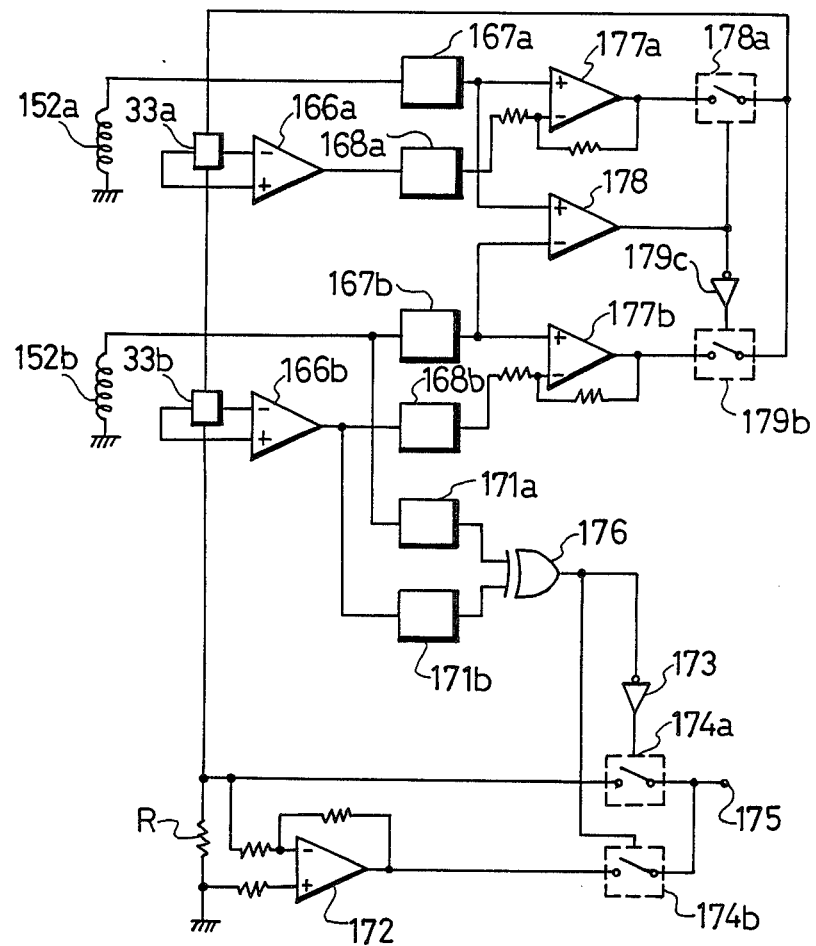
FIG. 29 is a circuit diagram illustrating another example of the electric circuit of the apparatus of the present invention.

In FIG. 29, the outputs from the absolute value circuits 167a, 167b, 168a, and 168b are the same as those of FIG. 28, each being shown in the curves 158, 159, 160, and 161 of the graphs (a), (b), (c), and (d) of FIG. 27B.

Next, each output of the absolute value circuits 167a and 168a is input to the error amplifier 157a and each output of the absolute value circuits 167b and 168b is input to the error amplifier 177b.

The above-mentioned error amplifiers 177a and 177b operate so that the two inputs agree with each other. The error amplifier 177a operates so that the inputs $|E_{11}|$ and $|E_{13}|$ agree, thus $$K_{11}\cdot|N|\cdot|H_1| = K_{12}\cdot|H_1|\cdot I.$$

Therefore, the output current I of the error amplifier 177a is expressed as $$I = (K_{11}/K_{12})\cdot|N|,$$

and this value is proportional to only the rotation speed N. On the other hand, the error amplifier 177b operates so that the inputs $|E_{12}|$ and $|E_{14}|$ agree, thus $$K_{11}\cdot|N|\cdot|H_2| = K_{12}\cdot|H_2|\cdot I.$$

Therefore, the output current of the error amplifier 177b is likewise expressed as $$I = (K_{11}/K_{12})\cdot|N|,$$

and this value is equal to the output of the above-mentioned error amplifier 177a.

Figure 27D:
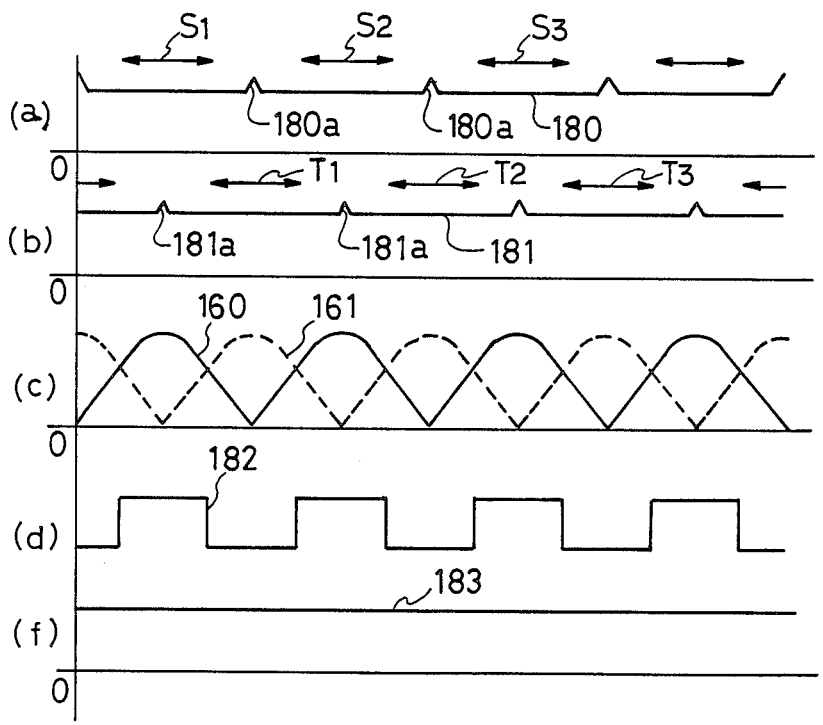

The outputs of the above-mentioned error amplifiers 177a and 177b are shown in the curves 180 and 181 of the graphs (a) and (b) of FIG. 27D, respectively. No linear portion is seen in the bending portions 180a and 181a of the above-mentioned curves 180 and 181. These portions are the outputs in the case that the afore-mentioned offset is not proper and that each of the two inputs of the error amplifiers 177a and 177b appear simultaneously near the valley points where the errors are large.

The curves 160 and 161 shown in the graph (c) of FIG. 27D show the output waveform of the above-mentioned absolute value circuits 167a and 167b, respectively. These outputs are input to a comparator 178, the output is as shown in the curve 182 of the graph (d) of FIG. 27D. An analog switch 179a is closed by the high level portion of this curve, and at the same time, an analog switch 179b is opened because it is provided with an inverter circuit 179c at the front stage of its control terminal.

Therefore, assuming that the outputs of the analog switches 179a and 179b are common, and with respect to the signal at the point X, the high level portion of the curve 182 is only the output from the analog switch 179a. That is, the outputs of the intervals indicated by the arrows $S_1$, $S_2$, - - - of the graph (a) of FIG. 27D, (i.e. of only the portions in which the bending portions 180a are eliminated from the curve 180) are obtained. In the low level portions of the curve 182, they are opposite to the former portions. And the outputs of the intervals indicated by the arrows $T_1$, $T_2$, - - - (i.e. of only the portions in which the bending portions 181a are eliminated from the curve 181) are obtained. Consequently, in both the high and low level portions, the signal at the point X is as shown in the curve 183 of the graph (f) of FIG. 27D, As will be understood from the above-described theory, an output in proportion to the rotation speed N is obtained. The circuit from the point X is connected in like manner as in FIG. 28 so that the output current I is supplied as the control current of the Hall elements 33a and 33b. A voltage drop occurs across the resistor R by the current I flowing to the Hall element, and a rotation speed signal V is obtained. Thus, the rotation speed signal V is output to the terminal 175 during forward rotation and a signal $-V$ is output during reverse rotation. The construction of the logical circuit and so on for discriminating the forward or reverse rotation and the circuit configuration from the resistor R to the terminal 175 are the same as in the circuit of FIG. 28 and their descriptions are thus omitted.

In the above-described circuits of FIGS. 28 and 29, when the directions are discriminated, if the edge portions of the square waves of two systems to be input to the exclusive OR circuit 176 agree with each other, correct discrimination can be performed. However, if the offset voltage for the Hall elements and absolute value circuits is not proper, a time difference (lag or advancement) occurs at the edge portions, for example, a negative voltage may occur intermittently at the final output terminal 175 even during forward rotation.

Figure 30:
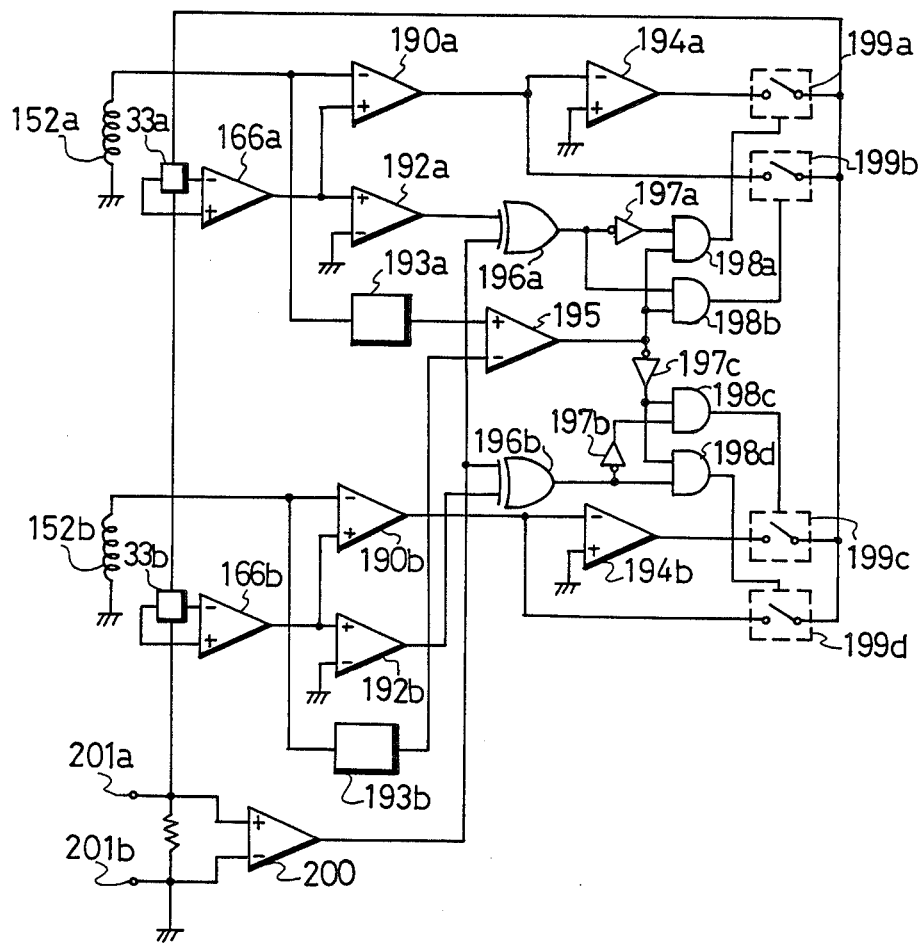
FIG. 30 is a circuit diagram illustrating further another example of the electric circuit of the apparatus of the present invention.

FIG. 30 illustrates the circuit diagram of another example which is so constructed in consideration of such points. This circuit is constructed as described hereinbelow.

The output ($E_e$) of the armature coils 152a and the output ($E_h$) of the Hall element 33a obtained through a differential amplifier 166a are input to a differential amplifier 190a, which operates so that both the outputs agree with each other. The output $E_e$ of the armature coils 152b (equal to the output of the coils 152a) and the output $E_h$ of the Hall element 33b (equal to the output of the Hall element 33a) obtained through a differential amplifier 166b are also input to a differential amplifier 190b, which operates in the same manner as described above.

The output of the differential amplifier 190a is divided into two systems. One of them is input to an inverting amplifier 194a having unity gain after that it is input to an analog switch 199a. The other output is input directly to an analog switch 199b.

The output of the differential amplifier 190b is also divided into two systems in the same way. One of them is input to an analog switch 199c through an inverting amplifier 194b and the other is input directly to an analog switch 199d.

The above-mentioned outputs of the armature coils 152 and 152b are input to absolute value circuits 193a and 193b, respectively. The two outputs of these absolute value circuits 193a and 193b are input to the two input terminals of a comparator 195, respectively. The output of the comparator 195 is input to an inverter circuit 197c and also becomes a respective input of AND circuits 198a and 198b.

On the other hand, the outputs of the differential amplifiers 166a and 166b are also input to waveform shaping circuits 192a and 192b, respectively. The outputs of the waveform shaping circuits 192a and 192b are each input respectively to one input of exclusive OR circuits 196a and 196b. The other inputs of the exclusive OR circuits 196a and 196b receive the output from a waveform shaping circuit 200. The input terminals of waveform shaping circuit 200 are connected across a detection resistor R which is connected between the control current route of the Hall elements 33a and 33b are ground.

The inputs of the above-mentioned AND circuit 198a are connected with the output of the above-mentioned comparator 195 and the output of the inverter circuit 197a to which the output of the exclusive OR circuit 196a is input. The output of the AND circuit 198a is connected to the control input of the analog switch 199a.

The inputs of the AND circuit 198b are connected to the output of the comparator 195 and the output of the exclusive OR circuit 196a, and the output of the AND circuit 198b is connected to the control input of the analog switch 199b.

The inputs of the AND circuit 198c are connected to the output of the inverter circuit 197c and the output of the exclusive OR circuit 196b is obtained through the inverter circuit 197b. The output of the AND circuit 198c is connected to the control input of the analog switch 199c.

The inputs of the AND circuit 198d are connected to the output of the inverter circuit 197c and the output of the exclusive OR circuit 196b. The output of the AND circuit 198d is connected to the control input of the analog switch 199d. The outputs of the above-mentioned analog switches 199a, 199b, 199c, and 199d are made common and are input as the control current of the Hall elements 33a and 33b.

The final detection output is taken out from between the terminals 201a and 201b across the afore-mentioned resistor R.

Next, the fundamental principle for constituting the circuit described above will be explained. Firstly, in FIG. 29, it is an object of the differential amplifiers 177a and 177b at the last stage to operate so that the two input values which are input to these amplifiers agree with each other. Whether the current value to be supplied to the Hall element is increased or reduced is determined by which one among the two input values (the generated output of the armature coils and the output of the Hall element) is larger.

Numerals 190a and 190b in FIG. 30 correspond to the error amplifiers 177a and 177b of FIG. 29. The inputs of error amplifiers 190a and 190b do not connect with the absolute value circuit as shown in FIG. 29 but rather receive the direct outputs of the armature coil output $E_e$ and the Hall element output $E_h$. Thus, there are three possible conditions: one, in which both $E_e$ and $E_h$ are positive (voltages); another, where either of the two is negative; and a third, where both of them are negative.

Figures 31, 32:
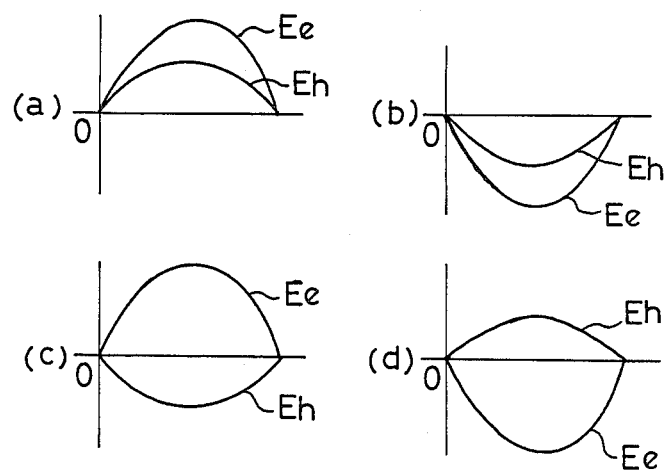
FIG. 32 is a truth table.

These conditions are shown in FIG. 31, wherein $E_e$ indicates the great output of the armature coils and $E_h$ indicates the output voltage of the Hall element. In this figure, four graphs (a) to (d) are shown.

In FIG. 30, the circuit is constructed so that the control current of the Hall element flows in both the positive and negative directions (in the drawing, in both the direction up and down). In the case that the current to be supplied to the Hall element is controlled so that the output voltage of the Hall element is equal to the generated output voltage of the coils, it is necessary to select whether the current corresponding to the $E_e-E_h$ is supplied to the Hall element or the current corresponding to $E_h-E_e$ is supplied to the Hall element by the direction of the current which is being supplied to the Hall element and by the state of the output voltage of the Hall element and by the state of the generated output voltage of the coils. The case in which the current corresponding to $E_e-E_h$ is supplied to the Hall element is referred to as Q and the case in which the current corresponding to $E_h-E_e$ is supplied to the Hall element is referred to as $\overline{Q}$. The current which flows downward to the Hall element is referred to as positive and the current which flows upward is referred to as negative.

Next, with respect to FIG. 31, it will now be described which one of Q and $\overline{Q}$ is selected in the graphs (a), (b), (c) and (d).

In the case that the downward (positive) current flows to the Hall element, i.e. the state (a), when the current corresponding to $E_e-E_h$ is supplied to the Hall element, the output amplitude of the Hall element becomes small and contrarily the value of $E_e-E_h$ becomes large. Consequently, the positive current, that is, the downward current increases and the output amplitude of the Hall element becomes large, so that this causes a restriction in decreasing of the output amplitude of the Hall element. On the other hand, when the output amplitude of the Hall element becomes large, the value of $E_e-E_h$ becomes small, so that the positive current, i.e. the downward current decreases and the output amplitude of the Hall element becomes small; this causes a restriction for increasing the output amplitude of the Hall element. Even if the output amplitude of the Hall element becomes large and exceeds the amplitude of the generated output of the coils, $E_e-E_h$ becomes negative and the negative current, i.e. upward current flows to the Hall element, so that the output of the Hall element drops. Therefore, the control circuit operates so that the output voltage of the Hall element agrees with the generated output voltage of the coils.

Consequently, in such a state (a), it is case Q.

In the case that the downward (positive) current flows to the Hall element, i.e. the state (b), when the current corresponding to $E_h-E_e$ is supplied to the Hall element, the output amplitude of the Hall element becomes small and the value of $E_h-E_e$ becomes large toward a positive value. Thus, the positive current, i.e. the downward current, increases and the output amplitude of the Hall element becomes large; this causes a restriction for decreasing of the output amplitude of the Hall element. When the output amplitude of the Hall element becomes large, the value of $E_h-E_e$ decreases toward a positive value, so that the positive current, i.e. the downward current decreases and the output amplitude of the Hall element becomes small; this causes a restriction for increasing of the output amplitude of the Hall element. Even if the output amplitude of the Hall element becomes large and exceeds the amplitude of the generated output of the coils, $E_h-E_e$ becomes negative and the negative current, i.e. upward current flows to the Hall element, so that the output of the Hall element increases. Thus, the control circuit operates so that the output voltage of the Hall element agrees with the generated output voltage of the coils.

Consequently, in such a state (b), it is case $\overline{Q}$.

In the case that the upward (negative) current flows to the Hall element, i.e. the state (a), when the current corresponding to $E_h-E_e$ is supplied to the Hall element, the output amplitude of the Hall element becomes small and the value of $E_h-E_e$ becomes large toward a negative value, so that the negative current, i.e. upward current increases and the output amplitude of the Hall element becomes large; this causes a restriction for decreasing of the output amplitude of the Hall element. When the output amplitude of the Hall element becomes large, the value of $E_h-E_e$ decreases toward a negative value, so that the negative current, i.e. upward current decreases and the output amplitude of the Hall element becomes small; this causes a restriction for increasing of the output amplitude of the Hall element. Even if the output amplitude of the Hall element becomes large and exceeds the amplitude of the generated output of the coils, $E_h-E_e$ becomes positive and the positive current, i.e. downward current flows to the Hall element, so that the output of the Hall element drops. Thus, the control circuit operates so that the output voltage of the Hall element agrees with the generated output voltage of the coils.

Consequently, in such a state (a), it is case $\overline{Q}$.

In the case that the upward (negative) current flows to the Hall element, i.e. the state (b), when the current corresponding to $E_e-E_h$ is supplied to the Hall element, the output amplitude of the Hall element decreases and the value of $E_e-E_h$ increases toward a negative value, so that the negative current, i.e. upward current increases and the output amplitude of the Hall element becomes large; this causes a restriction for decreasing of the output amplitude of the Hall element. When the output amplitude of the Hall element becomes large, the value of $E_e-E_h$ decreases toward a negative value, so that the negative current, i.e. upward current decreases and the output amplitude of the Hall element becomes small; this causes a restriction for increasing of the output amplitude of the Hall element. Even if the output amplitude of the Hall element becomes large and exceeds the amplitude of the generated output of the coils, $E_e-E_h$ becomes positive and the positive current, i.e. downward current flows to the Hall element, so that the output of the Hall element increases. Thus, the control circuit operates so that the output voltage of the Hall element and the generated output voltage of the coils agree with each other.

Consequently, in such a state (b), it is case Q.

Furthermore, when the downward (positive) current flows to the Hall element, i.e. the state of (c), when the negative current corresponding to $E_h-E_e$ is supplied to the Hall element, the output of the Hall element is inverted to be the same state as the state (a), in which the upward (negative) current flows to the Hall element, and the control circuit operates so that the output voltage of the Hall element agrees with the generated output voltage of the coils.

Consequently, in such a state (c), it is case $\overline{Q}$.

In the case of the state (d), when the negative current corresponding to $E_e-E_h$ is supplied to the Hall element, the output of the Hall element is inverted to be the same state as the state (b), in which the upward (negative) current flows to the Hall element, and the control circuit operates so that the output voltage of the Hall element agrees with the generated output voltage of the coils. Consequently, in such a state (d), it is case Q.

In the case that the upward (negative) current flows to the Hall element, i.e. the state of (c), when the positive current corresponding to $E_e-E_h$ is supplied to the Hall element, the output of the Hall element is inverted to be the same state as the state (a), in which the downward (positive) current flows to the Hall element, and the control circuit operates so that the output voltage of the Hall element agrees with the generated output voltage of the coils. Consequently, in such a state (c), it is case Q.

In the case of the state (d), when the positive current corresponding to $E_h-E_e$ is supplied to the Hall element, the output of the Hall element is inverted to be the same state as the state (b), in which the downward (positive) current flows to the Hall element, and the control circuit operates so that the output voltage of the Hall element agrees with the generated output voltage of the coils. Consequently, in such a state (d), it is case $\overline{Q}$.

Assuming that when the current which is being supplied to the Hall element is downward (positive), it is referred to as state 1 and when the output voltage of the Hall element is positive, it is also referred to as state 1, and when the generated output voltage of the coils is positive, it is also referred to as state 1, those states are as shown in the truth table of FIG. 32.

Therefore, the logical expression is $$Q = \overline{H} \cdot \overline{I} + H \cdot I.$$

(Where I indicates the current which is being supplied to the Hall element). The downward (positive) current is indicated by I and the upward (negative) current is indicated by $\overline{I}$.

A circuit meeting the conditions of the above-mentioned logical expression is shown in the circuit of FIG. 30. To take an instance, the case will be explained in which the current being supplied to the Hall element is downward (positive) and the output voltage of the Hall element is downward (positive). In FIG. 30, the output from a waveform shaping circuit 200 is at a high level since the voltage drop across the resistor R is positive. Therefore, one of the inputs of the exclusive OR circuit 196a is at a high level. On the other hand, the input of the differential amplifier 116a is at a high level since the output of the Hall element 33a is positive due to the conditioning described. That is, the waveform shaping circuit 192a of the next stage outputs a high level ouput due to the input voltage being higher than the ground electric potential. After all, the high level output from the above waveform shaping circuit 200 and the high level output from the waveform shaping circuit 192a are input to the exclusive OR circuit 196a, and its output assumes a low level. The output of the inverter circuit 197a assumes a high level as a result of this low level output and then it is input to one input terminals of the AND circuit 198a. When the other input of AND circuit 198a receives a high level input, its ouput assumes a high level so as to close the analog switch 199a, and this occurs when the comparator 195 outputs a high level.

The comparator 195 is the same as the comparator 178 of FIG. 29, which is used for extracting the portions where they are not affected easily by the offset voltage. It is the analog switch 199a that is closed when the comparator 195 outputs the high level output as described before.

The output from the inverting amplifier circuit 194a is input to the analog switch 199a, the input of inverting amplifier circuit 194a receiving the output of the differential amplifier 190a. As shown in the drawing, the inputs of the differential amplifier 190a are the output ($E_e$) of the armature coils 152 (to the inverting input terminal) and the output ($E_h$) of the Hall element (to the non-inverting input terminal), and its output is $E_h-E_e$. Therefore, the output of the above-mentioned inverting amplifier circuit 194a is $E_e-E_h$. When the analog switch 199a is closed, $E_e-E_h$ is output. The selection of $E_e-E_h$ means that Q is selected in FIG. 32; therefore, the conditions of Q are satisfied when $E_e$ is positive and is at logical 1 indicative of a high level and $E_h$ is also at logical 1 and the current I is at logical 1. The output of $E_e-E_h$ by the armature coils 152b and the Hall element 33b is selected when the output of comparator 195 is at a low level, and the analog switch 199c is closed. This operation is the same as that of the circuit comprising the armature coils 152 and the Hall element 33a; thus, its description is omitted.

One of the analog switches 199a, 199b, 199c, and 199d is appropriately selected according to each state of the directions of $E_e$ and $E_h$ of the current I as described before, and the correct direction discriminating output is obtained from between the final output terminals 201a and 201b.

From the above description, according to the apparatus of the present invention, it is possible to obtain a rotation speed signal without any ripple component, and which is proportional to only the number of rotations; in addition, the rotating direction can also be detected simultaneously.

An example of a two-phase motor was described as an embodiment; however, a similar method may also be applied to a three-or-more-phase motor.

In an example, the current value to be fed to the electromagnetic conversion elements is controlled so that the power generation outputs of the armature coils are equal to the outputs of the electromagnetic conversion elements. Nevertheless, it may also be possible to achieve the object of the invention by setting the current value to be supplied to the electromagnetic conversion elements at a predetermined value and by changing the gain of the amplifier circuit which amplifies the outputs of the electromagnetic conversion elements, thereby controlling the output levels so that the power generation outputs and the outputs of the amplifier circuit are equal.

As will be understood from the above descriptions of each example, the objects of the present invention were achieved and the remarkable effects are obtained.

What is claimed is:

1. A rotational detecting apparatus for producing an output proportional to rotational speed of a rotary machine having a rotary shaft, comprising:
   a magnetic means, having a plurality of magnetic poles, arranged to rotate along with said shaft of said rotary machine so as to provide a rotating magnetic field flux density of which varies at fixed points in time relation to said rotational speed;
   a first means, fixedly disposed in said rotating magnetic field, comprising electromagnetic conversion means including at least one Hall element operating on the Hall principle to provide a first output voltage the amplitude of which is a function only of magnetic flux density of said rotating magnetic field;
   a second means, fixedly disposed in said rotating magnetic field, comprising an inductance means operating by electromagnetic induction to provide a second output voltage the amplitude of which is a function of both flux density of said magnetic field and its rotational speed; and
   electric circuit means for receiving said first and second output voltages and producing as an output a third output voltage corresponding to a quotient of the value of said second output voltage divided by the value of said first output voltage, said third output voltage being directly proportional to said rotational speed of said rotating magnetic field and independent of its flux density.

2. The apparatus as set forth in claim 1 wherein said rotary machine is a DC motor and said magnetic means is the sole driving rotor of said DC motor.

3. The apparatus as set forth in claim 1 wherein said rotary machine is a DC motor and said electromagnetic conversion means are position detecting Hall elements of the DC motor.

4. The apparatus as set forth in claim 1, wherein said first output voltage and said second output voltage are each formed of sine pulses, respectively.

5. The apparatus as set forth in claim 1 wherein said first output voltage and said second output voltage are each formed of expotential pulses, respectively.

6. The apparatus as set forth in claim 1 wherein said inductance means is a plurality of armature coils attached to a fixed armature of said rotary machine, said magnetic means is a field magnet adapted for rotation along with the rotary shaft of the rotary machine with said magnetic poles facing said armature so that said magnetic field may penetrate through said armature coil, and a plurality of said electromagnetic conversion means comprise Hall element detectors which are fixed to positions at the same phase angle as multi-phase armature coils of said rotary machine so that said electromagnetic conversion means can detect the magnetic field strength of said field magnetic; said apparatus further comprising an electric circuit for obtaining a voltage in proportion to the number of rotations of said rotary shaft by using both an output voltage of said multi-phase armature coils and an output voltage of said electromagnetic conversion means as input signals to said electric circuit means.

7. The apparatus as set forth in claim 6 wherein said rotary machine is a DC motor and said fixed armature comprises a fixed armature for driving said motor which supplies electric power to corresponding armature coils through each output of said electromagnetic conversion means to generate a driving torque of said motor and a fixed armature for power generation which includes a plurality of armature coils for power generation, each being disposed in positions at the same phase angle as respective ones of said Hall element detectors of said electromagnetic conversion means.

8. The apparatus as set forth in claim 6 wherein said rotary machine is a DC motor and said fixed armature is a fixed armature for driving said motor which supplies electric power to corresponding armature coils through each output of said electromagnetic conversion means to generate a driving torque of said motor; said apparatus further comprising a multi-phase counter electromotive force detecting circuit for detecting counter electromotive forces at each phase of said armature coils by using both an output of said detecting circuit and an output of said electromagnetic conversion means as input signals to said electric circuit means.

9. The apparatus as set forth in claim 6 wherein said electric circuit means comprises a plurality of amplifier circuits which amplify outputs of said plurality of electromagnetic conversion means, a negative feedback circuit which detects the difference between the power generation outputs of said multi-phase armature coils and an output from the amplifier circuit which amplifier circuit amplifies outputs of the electromagnetic conversion means corresponding to each of the armature coils and supplies an error signal thus obtained to control current lines of said electromagnetic conversion means, thereby controlling output levels of said control current lines so that power generation output is equal to the output of the amplifier circuit, and a rotation detecting circuit which receives an input signal proportional to the number of rotations of the field magnetic and corresponding to a current value of current to be fed to said control current lines of said electromagnetic conversion means.

10. A rotation detecting apparatus for detecting the rotational rate of a rotary machine, having a rotary shaft, comprising:

means for driving said shaft in forward and reverse rotating directions;

magnet means having a plurality of adjacent equal and alternately arranged radial magnetic poles, said magnetic means being rotatable with said rotary shaft, for generating a magnetic field radially outwardly of said rotary shaft, said magnetic field corresponding to said plurality of magnetic poles and reversing its polarity with respect to fixed points radially outward of said rotary shaft as said rotary shaft rotates, electromagnetic conversion means, including at least one Hall element operating on the Hall principle, fixedly disposed in said magnetic field, for providing a first voltage signal having an amplitude proportional to only the flux density of said magnetic field;

inductance means, operating by electromagnetic induction, fixedly disposed in said magnetic field and spaced at a predetermined interval from said electromagnetic conversion means in a rotating direction of said rotary shaft, for providing a second voltage signal corresponding to a voltage induced therein by said rotating magnetic field as said magnetic means rotates with said rotary shaft; and electric circuit means in operable connection with said electromagnetic conversion means and said inductance means, for providing a third voltage signal proportional to the rotational rate of said rotary shaft, said third voltage signal corresponding to the quotient of the value of said second voltage signal divided by the value of said first voltage signal.

11. The rotation detecting apparatus of claim 10, wherein said electric circuit means provides said third voltage signal as a direct current voltage having positive polarity corresponding to rotation of said rotary shaft in said forward direction and having negative polarity corresponding to rotation of said rotary shaft in said reverse direction.

* * * * *